US012478809B2

(12) United States Patent
Besson et al.

(10) Patent No.: US 12,478,809 B2
(45) Date of Patent: Nov. 25, 2025

(54) QUICK-DONNING AND PREVENTIVE WEARING RESPIRATORY MASK SYSTEM FOR AIRCRAFT CREW MEMBER

(71) Applicant: SAFRAN AEROTECHNICS, Plaisir (FR)

(72) Inventors: Alexandre Besson, Sevres (FR); Jean-Baptiste Delprat, Saclay (FR); Jeremy Jacotey, Bougival (FR); Olivier Potet, La ville-du-bois (FR); Jean-Philippe Sibuet, Verneuil-sur-seine (FR); Adrien Vasseur, Dirinon (FR)

(73) Assignee: Safran Aerotechnics, Plaisir (FR)

( * ) Notice: Subject to any disclaimer, the term of this patent is extended or adjusted under 35 U.S.C. 154(b) by 527 days.

(21) Appl. No.: 17/617,789

(22) PCT Filed: Jun. 26, 2020

(86) PCT No.: PCT/IB2020/056090

§ 371 (c)(1),
(2) Date: Dec. 9, 2021

(87) PCT Pub. No.: WO2020/261224

PCT Pub. Date: Dec. 30, 2020

(65) Prior Publication Data

US 2022/0226677 A1 Jul. 21, 2022

Related U.S. Application Data

(60) Provisional application No. 62/868,078, filed on Jun. 28, 2019.

(51) Int. Cl.

| | |
|---|---|
| ***A62B 18/08*** | (2006.01) |
| ***A62B 7/14*** | (2006.01) |
| ***B64D 11/00*** | (2006.01) |

(52) U.S. Cl.
CPC .............. *A62B 18/084* (2013.01); *A62B 7/14* (2013.01); *B64D 11/00* (2013.01); *B64D 2231/025* (2013.01)

(58) Field of Classification Search
CPC ....... A62B 18/084; A62B 18/02; A62B 18/08; A62B 18/00; A62B 18/04; A62B 7/14;
(Continued)

(56) References Cited

U.S. PATENT DOCUMENTS 5,735,266 A * 4/1998 Smith .............. A61M 16/0875 128/207.14
6,886,559 B2 * 5/2005 McDonald ........... A62B 18/084 128/201.24
(Continued)

FOREIGN PATENT DOCUMENTS

WO 2019008446 1/2019

OTHER PUBLICATIONS

European Application No. 20735697.3, Office Action mailed on Nov. 29, 2023, 4 pages.
(Continued)

*Primary Examiner* — Rachel T Sippel
*Assistant Examiner* — Gwynneth L Howell
(74) *Attorney, Agent, or Firm* — Kilpatrick Townsend & Stockton LLP

(57) ABSTRACT

A head armature for a respiratory system includes a cradle and a retention mechanism. The cradle is configured to receive a respiratory mask assembly in a stand-by position. The retention mechanism is configured to detachably connect the respiratory mask assembly with the head armature such that the respiratory mask assembly is movable from the stand-by position to a use position while connected to the head armature and such that the respiratory mask assembly is selectively detachable from the head armature in a stand-alone configuration whereby the respiratory mask assembly is disconnected from the head armature. In the use position, the respiratory mask assembly is configured to provide
(Continued)

oxygen to a user. The head armature is configured to be worn on a head of the user such that the cradle is between the respiratory mask assembly and the user's head when the respiratory mask assembly is in the stand-by position.

20 Claims, 14 Drawing Sheets

(58) Field of Classification Search
CPC .. A62B 7/00; A62B 9/00; A62B 16/00; B64D 2231/025; B64D 11/00; B64D 13/00; A61M 16/0683; A41D 13/1161; A41D 13/11
See application file for complete search history.

(56) References Cited

U.S. PATENT DOCUMENTS

| | | | | |
|---|---|---|---|---|
| 10,537,752 | B2 * | 1/2020 | Cooper | A62B 7/14 |
| 11,752,369 | B2 * | 9/2023 | Kliem | A62B 7/14 128/201.19 |
| 2003/0000001 | A1 | 1/2003 | McDonald et al. | |
| 2007/0163595 | A1 * | 7/2007 | Chen | A41D 13/1161 128/207.11 |
| 2016/0228732 | A1 * | 8/2016 | Cooper | A62B 18/02 |
| 2019/0151589 | A1 * | 5/2019 | Kwok | A62B 18/025 |

OTHER PUBLICATIONS

International Application No. PCT/IB2020/056090, International Preliminary Report on Patentability mailed on Jan. 6, 2022, 9 pages.

International Application No. PCT/IB2020/056090, International Search Report and Written Opinion mailed on Sep. 10, 2020, 12 pages.

European Application No. 20735697.3, Summons to Attend Oral Proceedings mailed on Jan. 22, 2025, 5 pages.

* cited by examiner

QUICK-DONNING AND PREVENTIVE WEARING RESPIRATORY MASK SYSTEM FOR AIRCRAFT CREW MEMBER

REFERENCE TO RELATED APPLICATION

This application claims the benefit of U.S. Provisional Patent Application No. 62/868,078, filed on Jun. 28, 2019 and entitled QUICK-DONNING AND PREVENTIVE WEARING RESPIRATORY MASK SYSTEM FOR AIRCRAFT PILOT, the content of which is hereby incorporated by reference in its entirety.

FIELD OF THE INVENTION

The field of the invention relates to respiratory equipment for crew members of an aircraft, such as pilots, and more particularly to respiratory equipment that can be used to supply oxygen to the crew member.

BACKGROUND

During travel on an aircraft, various personnel, including but not limited to pilots, navigation officers, and other flight crew personnel, may need to wear respiratory equipment or have respiratory equipment easily accessible for certain situations to avoid or reduce hypoxia. For example, such respiratory equipment may need to be easily accessible at cruising altitudes about 41,000 feet and/or if only one pilot is present in the flight deck for cruising altitudes above 25,000 feet. Such respiratory equipment may also need to be readily accessible for various flight domain conditions and/or geographical areas (e.g., high mountains areas).

The commercial aviation industry has a requirement that respiratory equipment designed for crew usage must be capable of being donned in five seconds or less and with a single hand (among other requirements) to minimize or prevent hypoxia during the emergency situation. While existing masks are functionally useful, they are uncomfortable to wear for long periods of time and are not possible and/or are impractical to wear in a preventive or stand-by mode in which the user is wearing the respiratory equipment but not using the respiratory equipment to receive oxygen.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a head armature for a respiratory system includes a cradle and a retention mechanism. The cradle is configured to receive a respiratory mask assembly in a stand-by position, and the retention mechanism is configured to detachably connect the respiratory mask assembly with the head armature. In certain aspects, the retention mechanism detachably connects the head armature to the respiratory mask assembly such that the respiratory mask assembly is movable from the stand-by position to a use position while connected to the head armature and such that the respiratory mask assembly is selectively detachable from the head armature in a stand-alone configuration whereby the respiratory mask assembly is disconnected from the head armature. In various embodiments, in the use position, the respiratory mask assembly is configured to provide oxygen to a user. In certain aspects, the head armature is configured to be worn on a head of the user such that the cradle is between the respiratory mask assembly and the user's head when the respiratory mask assembly is in the stand-by position.

In some embodiments, the cradle is configured to receive a respiratory mask of the respiratory mask assembly in the stand-by position. In various cases, the retention mechanism is configured to detachably connect the head armature to a harness of the respiratory mask assembly. In certain aspects, the retention mechanism is configured to detachably connect the head armature to at least one of an upper harness of the harness, a lower harness of the harness, or at least one spacer of the harness. In various examples, the retention mechanism includes at least one of a snap fastener, a buckle, a clip, a magnet, or hook and loop fasteners. In certain embodiments, the retention mechanism is configured to detachably connect the head armature to a respiratory mask of the respiratory mask assembly.

According to certain embodiments of the present invention, a quick donning respiratory system includes a head armature and a respiratory mask assembly. The head armature includes a cradle and a retention mechanism, and the respiratory mask assembly is received on the cradle in a stand-by position. In various aspects, the retention mechanism detachably connects the respiratory mask assembly with the head armature such that the respiratory mask assembly is movable from the stand-by position to a use position while connected to the head armature and such that the respiratory mask assembly is selectively detachable from the head armature to provide a stand-alone configuration whereby the respiratory mask assembly is disconnected from the head armature. In certain cases, in the use position, the respiratory mask assembly provides oxygen to a user. In some embodiments, the head armature is configured to be worn on a head of the user such that the cradle is between the respiratory mask assembly and the user's head when the respiratory mask assembly is in the stand-by position.

In some embodiments, the respiratory mask assembly includes a respiratory mask and a harness, and the respiratory mask is received on the cradle in the stand-by position. In certain embodiments, the retention member detachably connects the head armature with the harness of the respiratory mask assembly. In various cases, the harness includes an upper harness, a lower harness, and at least one spacer extending between the upper harness and the lower harness, and the retention member detachably connects the head armature with at least one of the upper harness, the lower harness, or the at least one spacer.

In certain embodiments, the retention member detachably connects the head armature with the respiratory mask. In some cases, the harness is inflatable. In various aspects, the retention mechanism includes at least one of a snap fastener, a buckle, a clip, a magnet, or hook and loop fasteners.

According to certain embodiments of the present invention, a quick donning respiratory system includes a head armature having a cradle and a retention mechanism. The quick donning respiratory system also includes a respiratory mask assembly having a respiratory mask and a harness. In various aspects, the respiratory mask of the respiratory mask assembly is received on the cradle in a stand-by position. The retention mechanism may detachably connect the respiratory mask assembly with the head armature at least while the respiratory mask assembly is in the stand-by position. In certain cases, in the stand-by position, the respiratory mask assembly does not provide oxygen to a user. In various embodiments, the head armature is configured to be worn on a head of the user such that the cradle is between the respiratory mask of the respiratory mask assembly and the user's head when the respiratory mask assembly is in the stand-by position.

In various embodiments, the retention member detachably connects the head armature with the harness of the respiratory mask assembly. In some embodiments, the harness includes an upper harness, a lower harness, and at least one spacer extending between the upper harness and the lower harness, and the retention member detachably connects the head armature with at least one of the upper harness, the lower harness, or the at least one spacer.

In some aspects, the retention member detachably connects the head armature with the respiratory mask. In various cases, the harness of the respiratory mask assembly is detached from the head armature. In certain cases, the retention mechanism detachably connects the respiratory mask assembly with the head armature such that the respiratory mask assembly is movable from the stand-by position to a use position while connected to the head armature and such that the respiratory mask assembly is movable to a stand-alone configuration disconnected from the head armature. In various embodiments, the retention mechanism includes at least one of a snap fastener, a buckle, a clip, a magnet, or hook and loop fasteners.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are respiratory systems for supplying oxygen to a crew member of an aircraft. In various examples, the respiratory systems include a head armature and a respiratory mask assembly. The head armature is configured to be worn on a head of a user and includes a cradle and a retention mechanism. The respiratory mask assembly includes a mask and an inflatable harness. The retention mechanism detachably connects the respiratory mask assembly with the head armature such that the respiratory mask assembly is positionable and movable between a stowed position, a stand-by position, and a use position as desired. In the use position, a mask of the respiratory mask assembly may be positioned around the mouth and nose of the user to supply oxygen to the user. The respiratory mask assembly may be in the use position while connected to the head armature via the retention mechanism or in a stand-alone configuration whereby the respiratory mask assembly is disconnected from the head armature. In the stowed position, the respiratory mask assembly may be detached and disconnected from the head armature (via the detachable retention mechanism) and optionally may be stowed in a location separate from the head armature. In the stowed position, the respiratory mask assembly does not supply oxygen to the user. In the stand-by position, the mask of the respiratory mask assembly may be supported on the cradle of the head armature such that the cradle is between the mask and the user's head. In various aspects, the respiratory mask assembly does not provide oxygen to the user in the stand-by position. In certain aspects, the respiratory systems disclosed herein are quick donning, meaning that the user can position the respiratory mask assembly in the use position in a short amount of time from the stand-by position or from the stowed position. In some cases, the short amount of time is about five seconds or less. The respiratory system with the detachable retention mechanism that selectively connects the head armature with the respiratory mask assembly allows the respiratory system to be used in various situations or arrangements as desired while promoting the comfort and safety of the user.

Respiratory System

Figure 1:
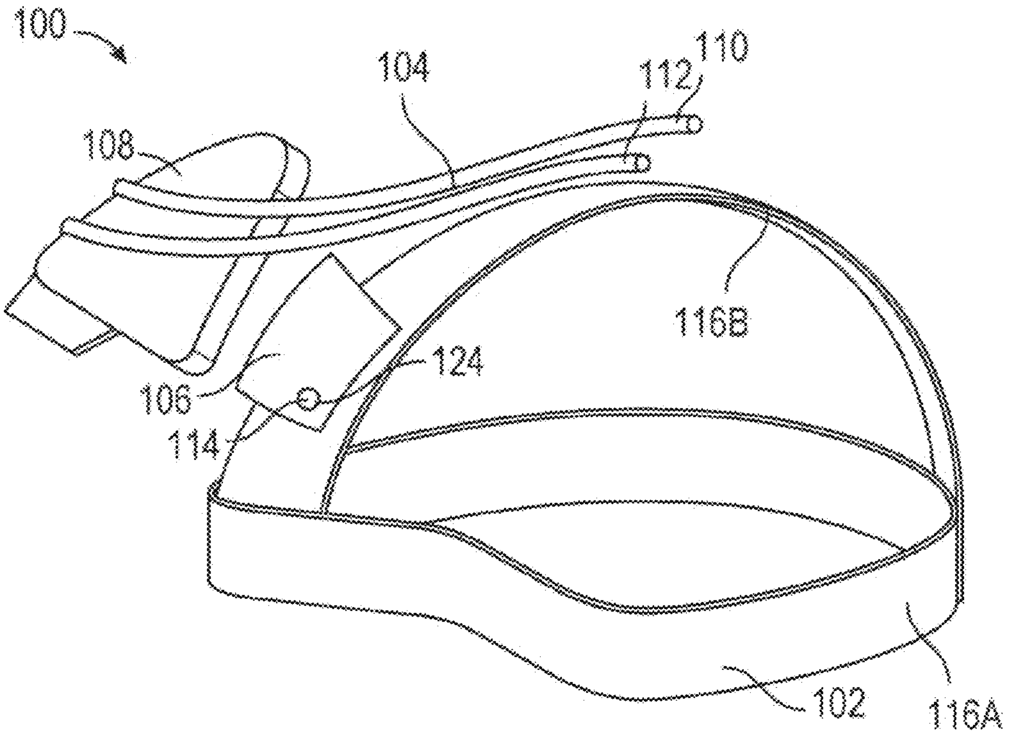
FIG. 1 illustrates a respiratory system including a head armature and a respiratory mask assembly according to certain embodiments of the present invention.
Figure 2:
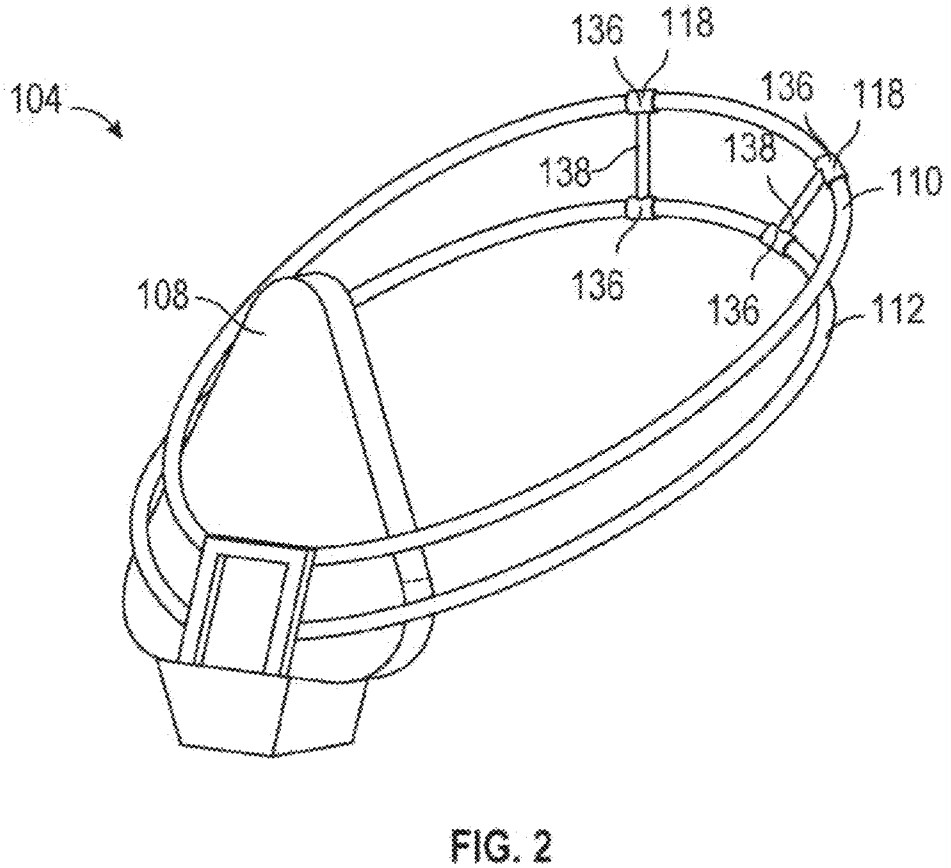
FIG. 2 illustrates the respiratory mask assembly of the respiratory system of FIG. 1.

FIGS. 1 and 2 illustrate an example of a respiratory system 100 for a crew member of an aircraft according to various embodiments. The respiratory system 100 includes a head armature 102, a respiratory mask assembly 104, and at least one detachable retention mechanism 114. In certain aspects, and as discussed in detail below, the respiratory mask assembly 104 may be used as a stand-alone quick donning mask assembly.

The head armature 102 is configured to be worn on the head of the user and may be a continuous or discontinuous structure with one or more portions 116. The portions 116 may be adjustable to adjust a size of the head armature, although they need not be adjustable in other embodiments. In the embodiment illustrated in FIG. 1, the head armature 102 includes a circumferential portion 116A and a transverse portion 116B extending in a forward-aft direction. The head armature 102 includes a cradle 106 that may selectively receive a piece of the respiratory mask assembly 104 such as a mask 108. In certain aspects, the head armature 102 is configured to be worn on the head of the user such that the cradle 106 is proximate to a forehead region of the user's head. In various cases, the head armature 102 may be constructed from various suitable materials as desired such that the head armature 102 is adjustable to fit various anthropometric dimensions of various users as desired. The head armature 102 may be constructed from various suitable materials such that it is comfortable for the user to wear even for long periods of time.

Figure 3:
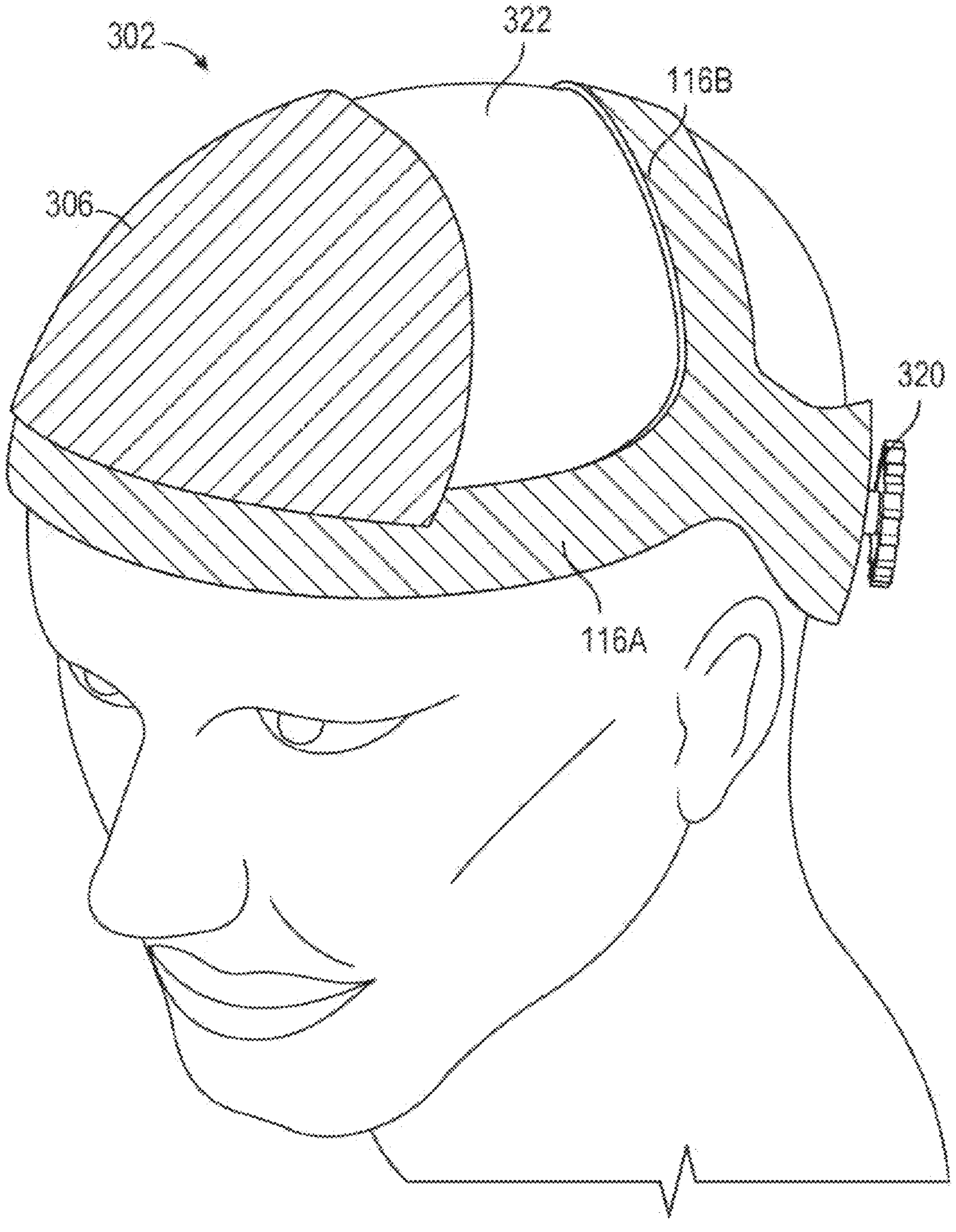
FIG. 3 illustrates a head armature of a respiratory system according to certain embodiments of the present invention.

FIG. 3 illustrates another embodiment of a head armature 302 that is similar to the head armature 102 except that the head armature 302 includes the transverse portion 116B extending in a side-to-side direction, and a cradle 306 of the head armature 302 has a different shape compared to the cradle 106 of the head armature 102. The head armature 302 also includes an adjustment mechanism 320 such that the portions 116 can be adjusted to better conform to the anthropometric dimensions of a head 322 of a user.

Referring back to FIGS. 1 and 2, the respiratory mask assembly 104 includes the mask 108 and one or more harnesses. The mask is configured to be positioned around a mouth and nose of the user in a use position and as discussed in detail below. In the embodiment illustrated in FIG. 1, the respiratory mask assembly 104 includes an upper harness 110 and a lower harness 112, but in other embodiments, a single harness or more than two harnesses may be utilized. In various embodiments, the harnesses 110, 112 are inflatable and may be coupled to a pressurized gas source. The pressurized gas may be controlled to selectively inflate the harnesses 110, 112 to facilitate positioning of the mask 108 opposite the mouth and nose of the user when the respiratory mask assembly 104 is in the use position and supplying oxygen to the user. In various examples, an inflation of the inflatable harness(es) causes an extension of the harness(es) such that the mask 108 can be brought proximate the mouth and nose of the user.

In some cases, and as illustrated in FIG. 2, the respiratory mask assembly 104 may include one or more spacers 118 that selectively space the upper harness 110 apart from the lower harness 112. The number of spacers 118 should not be considered limiting on the disclosure. For example, in various embodiments, the respiratory mask assembly 104 may include no (zero) spacers, one spacer 118, two spacers 118, three spacers 118, four spacers 118, more than four spacers 118, etc. Each spacer 118 includes opposing harness-receiving portions 136 that are connected by a connecting portion 138. In various cases, the at least one spacer 118 may be inflatable similar to the harnesses 110, 112, while in other cases, the at least one spacer 118 may be fixed. In other embodiments, the at least one spacer 118 may be omitted.

In some embodiments, the respiratory mask assembly 104 can be used as a quick donning mask assembly without need of the head armature 102. In other embodiments, the head armature 102 and the respiratory mask assembly 104 are detachably connected to each other via the retention mechanism 114. As will be discussed in detail below with reference to FIGS. 5-24, the detachable retention mechanism 114 may be various suitable devices, mechanisms, or components for selectively attaching the head armature 102 with the respiratory mask assembly 104 while also allowing the respiratory mask assembly 104 to be disconnected and detached from the head armature 102. In various cases, the retention mechanism 114 may support the harnesses 110, 112 of the respiratory mask assembly 104 such that the harnesses 110, 112 do not fall too low when the respiratory mask assembly 104 is in a stand-by position (discussed below). In certain embodiments, the retention mechanism 114 may be positive (e.g., a specific action is required from the user when detaching is needed) or passive (e.g., pulling the respiratory mask assembly 104 will detach it without requiring any additional or specific action). In some embodiments, the passive retention mechanism 114 may have a holding strength that is sufficient to counteract the weight of the harnesses 110, 112 and/or the force generated by the inflation of the harnesses 110, 112. In other words, the passive retention mechanism 114 does not independently become detached without action by the user and instead requires the user to pull on the respiratory mask assembly 10 to detach it.

In some cases, the retention mechanism 114 has a first component on the head armature 102 and a second, complimentary component on the respiratory mask assembly 104 that selectively engages the first component. The retention mechanism 114 may be at various locations as desired on each of the head armature 102 and the respiratory mask assembly 104. In some cases, the location of the retention mechanism 114 may be adjustable to suit the shape of the user's head or provide other comfort if needed. As one example, the retention mechanism 114 may be on the cradle 106 and/or one or more portions 116 of the head armature 102. As another example, the retention mechanism 114 may be on the mask 108, the upper harness 110, the lower harness 112, and/or one or more of the at least one spacer 118 of the respiratory mask assembly 104. In the embodiment illustrated in FIG. 1, the retention mechanism 114 is a snap component 124 provided on the cradle 106 that selectively engages a complimentary component (not visible) on the mask 108. As used herein, complimentary components are those having the necessary structure, attachment mechanism, etc. such that the two components can be connected together. A male snap component and a female snap component are a non-limiting example of complimentary components. Other non-limiting examples of complimentary components include, but are not limited to, hook fasteners and loop fasteners, buckles and buckle apertures, magnets with opposite polarities, etc.

Figure 4A:
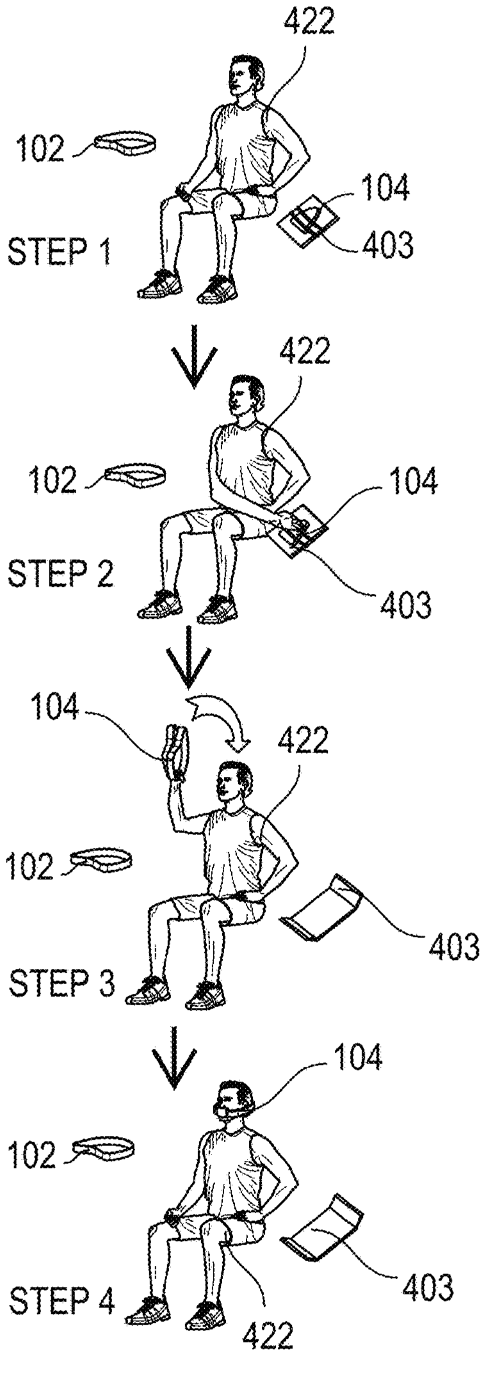
FIG. 4A illustrates a series of steps of quickly donning a respiratory mask assembly of a respiratory system in an emergency situation and positioning the respiratory mask assembly in a use position according to certain embodiments of the present invention.
Figure 4B:
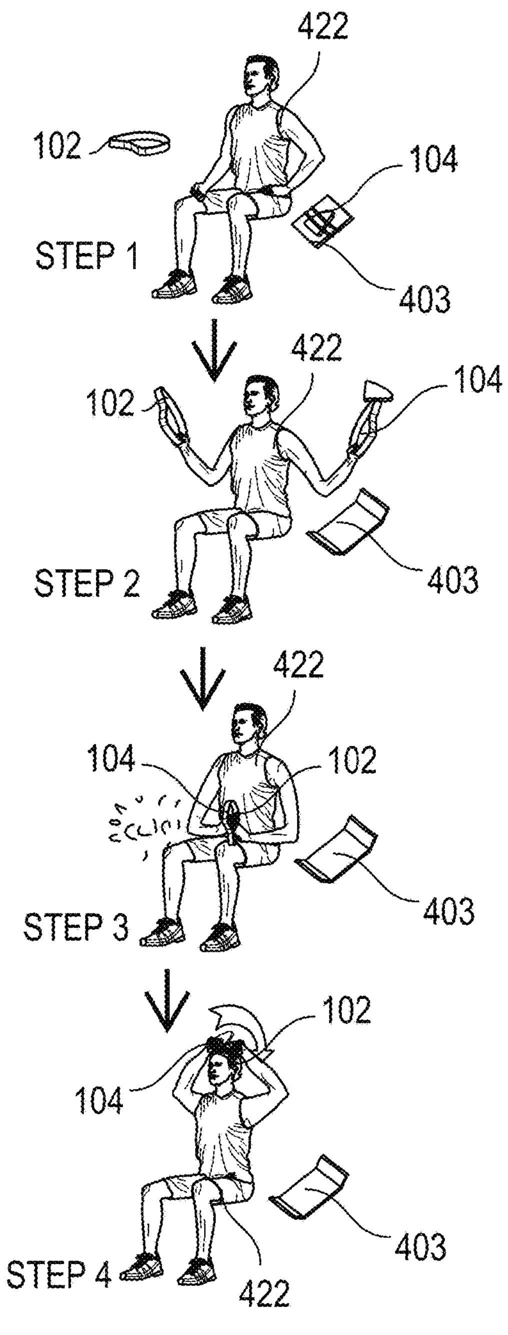
FIG. 4B illustrates a series of steps of preparing respiratory system and positioning the respiratory system in a stand-by position according to certain embodiments of the present invention.
Figure 4C:
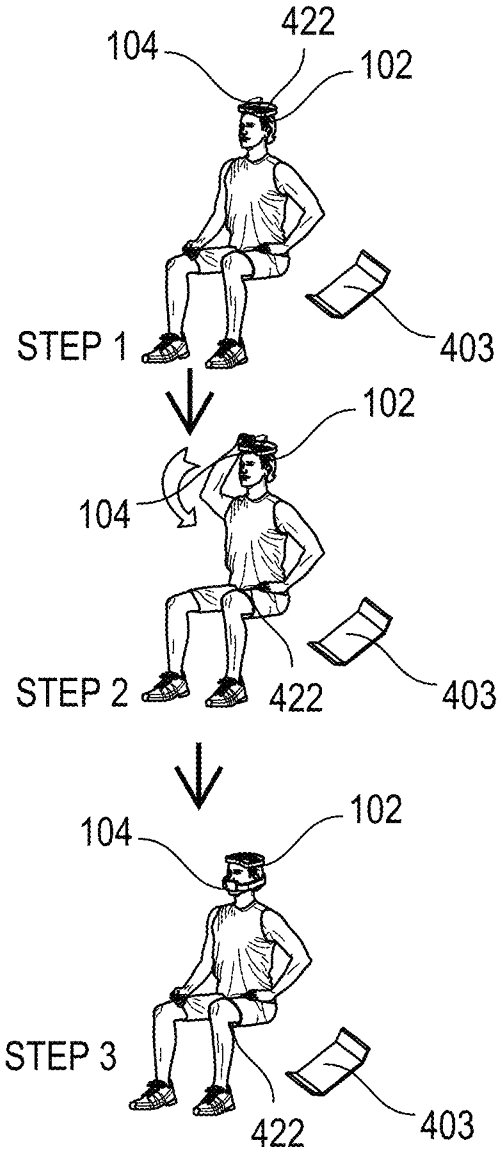
FIG. 4C illustrates a series of steps of moving the respiratory system from the stand-by position illustrated in FIG. 4B to a use position according to certain embodiments of the present invention.

Referring to FIGS. 4A-C, the detachable retention mechanism 114 allows the head armature 102 and the respiratory mask assembly 104 to be attached or detached as desired and such that the head armature 102 can be positionable in a stowed position (FIG. 4A), a stand-by position (FIG. 4B), a first use position (FIG. 4A), and a second use position (FIG. 4C). In FIG. 4A, the head armature 102 is not used (i.e., it is left in a stowed position) and the respiratory mask assembly 104 is used as a stand-alone, quick-donning mask (i.e., without the head armature 102) with the respiratory mask assembly 104 over the mouth and nose of the user. In FIG. 4B, the head armature 104 is used in combination with the respiratory mask assembly 104 in order to position the respiratory mask assembly in a stand-by or preventive use position. In FIG. 4C, both the head armature 104 and the respiratory mask assembly 104 are used, initially in the stand-by position and then in the second use position with the respiratory mask assembly 104 over the mouth and nose of the user.

Referring to FIG. 4A, in some embodiments, the respiratory system 100 may be moved from the stowed position to a first use position. Step 1 of FIG. 4A illustrates an example of the respiratory system 100 in a stowed position and a user 422 in a waiting situation. In some cases, in the stowed position and/or during the waiting situation, the head armature 102 is optionally detached from the respiratory mask assembly 104. In the example illustrated in Step 1 of FIG. 4A, the respiratory mask assembly 104 may be in a stowage box 403 or other suitable location, and the head armature 102 may not be placed over a head of the user 422. In other examples, the head armature 102 and the respiratory mask assembly 104 may be stowed together and/or attached to one another. Step 2 of FIG. 4A illustrates the start of an emergency situation requiring the quick donning of the respiratory mask assembly 104 (e.g., in five seconds or less and with one hand). In this step, the user 422 grabs only the respiratory mask assembly 104, and in Step 3, the user 422 places the respiratory mask assembly 104 over his head without assembling the respiratory mask assembly 104 with the head armature 102. Step 4 of FIG. 4A illustrates the respiratory mask assembly 104 in the first use position in which the mask 108 is positioned over the nose and mouth of the user 422 to protect the user 422 and without being attached to the head armature 102.

FIG. 4B illustrates an example of moving the respiratory system 100 from the stowed position to the stand-by position. Similar to Step 1 of FIG. 4A, Step 1 of FIG. 4B illustrates the respiratory system 100 in the stowed position and the user 422 in the waiting situation. In Step 2 of FIG. 4B, the user 422 is not in an emergency situation and may prepare the respiratory system 100 for preventive wearing. As illustrated in Step 2 of FIG. 4B, in this step, the user 422 removes both the head armature 102 and the respiratory mask assembly 104 from their stowage locations. In Step 3 of FIG. 4B, the user 422 attaches the respiratory mask assembly 104 to the head armature 102 via the retention mechanisms. In Step 4 of FIG. 4B, the user 422 places the assembled head armature 102 and respiratory mask assembly 104 over his head, and once the assembly is placed over the head of the user 422, the respiratory system 100 is in the stand-by position. The stand-by position does not require any modification to the respiratory mask assembly 104, and the stand-by position includes at least the mask 108 placed over the cradle 106 located on the head armature 102. The stand-by position allows for preventive wearing of the respiratory system 100 such that upon being needed, the user 422 can quickly move the mask 108 from the stand-by position to the second use position (discussed below with reference to FIG. 4C). In certain aspects, the head armature 102 allows for the user 422 to comfortably wear the respiratory system 100 in the stand-by position for long periods of time (e.g., for a complete duration of a flight).

FIG. 4C illustrates an example of moving the respiratory system 100 from the stand-by position to the second use position. Step 1 of FIG. 4C is similar to Step 4 of FIG. 4B and illustrates the respiratory system 100 in the stand-by position. In Step 2 of FIG. 4C, if an emergency situation occurs, the user 422 pulls down the mask 108 from the head armature 102 in a top down move. In various cases, Step 2 includes inflation of the harness(es) of the respiratory mask assembly 104. In Step 3 of FIG. 4C, the mask 108 is in the second use position and secured in place over the mouth and nose of the user 422. The second use position illustrated in Step 3 of FIG. 4C provides the same protection level as in Step 4 of FIG. 4A. The difference between the first use position and the second use position is that, in the first use position, the mask 108 is placed over the mouth and nose of the user 422 without the user 422 wearing the head armature 102, and, in the second use position, the mask 108 is placed over the mouth and nose of the user 422 while the user 422 is wearing the head armature 102. Moreover, in the first use position, the respiratory mask assembly 104 is detached from the head armature 102, and, in the second use position, the respiratory mask assembly 104 may be attached to or detached from the head armature 102. After use, the respiratory mask assembly 104 may be optionally detached from the head armature 102 (if not already detached) in order to return the respiratory system 100 to the stowed position with the respiratory mask assembly 104 and head armature 102 stowed separately.

Retention Mechanisms

FIGS. 5-24 illustrate various non-limiting examples of retention mechanisms that may be utilized to selectively attach a head armature with a respiratory mask assembly of a respiratory system. In figures where a single retention mechanism is illustrated, it will be appreciated that more than one retention mechanism may be provided on the head armature or respiratory mask assembly illustrated in the particular figure. It will further be appreciated that a complimentary component may be provided on the respiratory mask assembly or head armature even though such components may not be illustrated. Moreover, aspects or features of one embodiment may be included in conjunction with or in place of features illustrated in other embodiments.

FIGS. 5-14 illustrate examples where the retention mechanism 114 includes one or more of the snap components 124. In these examples, the snap components 124 may form an engagement such that the retention mechanism 114 is positive or passive. As discussed in detail below, when the retention mechanism includes one or more snap components 124, the snap components may be provided at various locations on the head armature and/or the respiratory mask assembly as desired. Moreover, where a plurality of snap components 124 are provided, the snap components 124 may be provided with different sizes and/or other identifying features to facilitate alignment and positioning of the head armature relative to the respiratory mask assembly when assembled.

Figure 5:
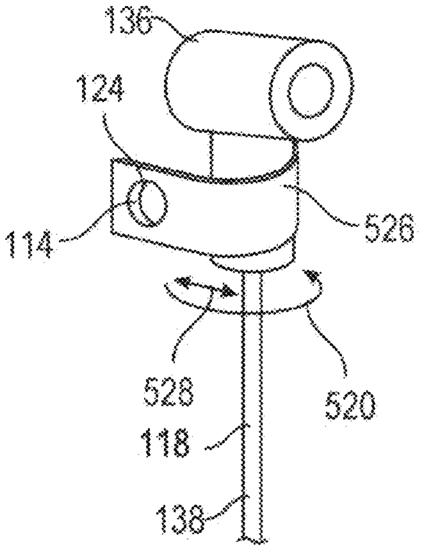
FIG. 5 illustrates a portion of a respiratory mask assembly of a respiratory system with an example of a retention mechanism according to embodiments of the disclosure.

FIG. 5 illustrates an example where the retention mechanism 114 includes the snap component 124 on a support 526 that is provided on the connecting portion 138 of the at least one spacer 118 of the respiratory mask assembly 104. In the example of FIG. 5, the support 526 may be adjustable in a lateral direction (represented by arrows 528) and/or may be rotatable about the at least one spacer 118 (represented by arrow 530) such that the position of the snap component 124 is adjustable. In certain embodiments, the support 526 may be constructed from various suitable materials such as fabric or soft silicon rubber to minimize hard pressure points against the user's head, particularly when the respiratory mask assembly is used without the head armature.

Figure 6:
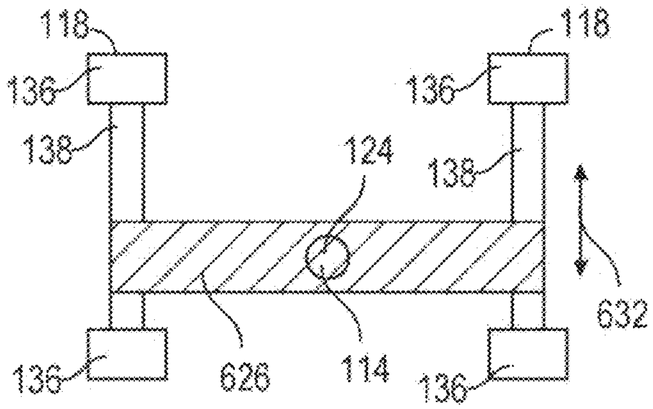
FIG. 6 illustrates a portion of a respiratory mask assembly of a respiratory system with another example of a retention mechanism according to embodiments of the disclosure.

FIG. 6 illustrates an example where the retention mechanism 114 includes the snap component 124 on a support 626 that is substantially similar to the support 526 except that the support 626 is connected to at least two spacers 118 of the respiratory mask assembly 104. In the example illustrated, the support 626 is connected to the connecting portion 138 of the spacers 118. In certain cases, the support 626 is vertically adjustable (represented by arrows 632) such that the position of the snap component 124 is adjustable. In certain cases, the snap component 124 may be placed on the support 626 such that it is midway between the spacers 118, although in other examples the snap component 124 may be provided at various other locations on the support 626 relative to the spacers 118 as desired.

Figure 7:
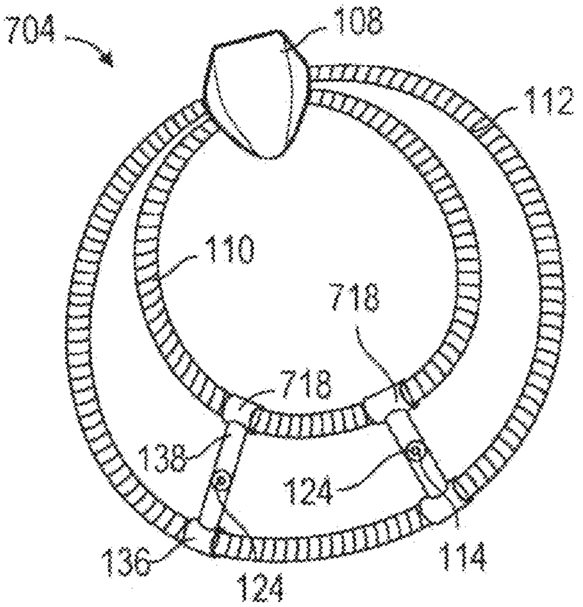
FIG. 7 illustrates a piece of respiratory equipment of a respiratory system with another example of a retention mechanism according to embodiments of the disclosure.

FIG. 7 illustrates an example of a respiratory mask assembly 704 that is substantially similar to the respiratory mask assembly 104 except that the retention mechanism 114 of the respiratory mask assembly 704 includes the snap component 124 provided directly on each spacer 718. In the example of FIG. 7, the snap components 124 are provided on the connecting portions 138 of the spacers 718.

Figure 8:
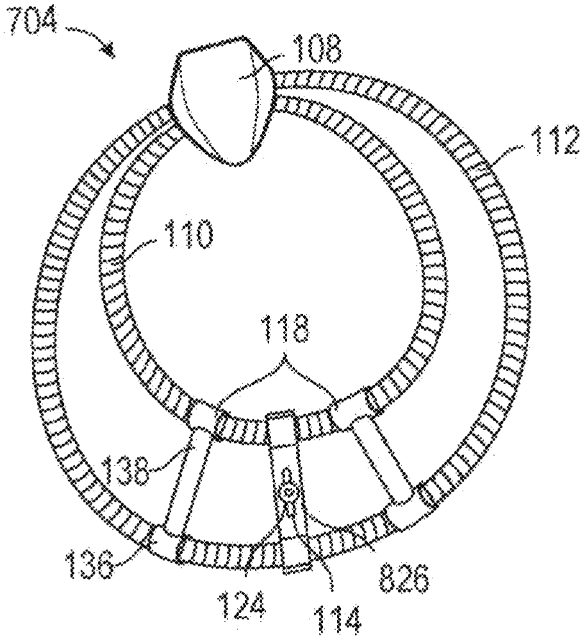
FIG. 8 illustrates a piece of respiratory equipment of a respiratory system with another example of a retention mechanism according to embodiments of the disclosure.

FIG. 8 illustrates an example of the respiratory mask assembly 704 where the retention mechanism 114 includes the snap component 124 on a support 826 that is substantially similar to the support 626 except that the support 826 is connected to and extends between the upper harness 110 and the lower harness 112. In this example, the support 826 may be movable along each of the upper harness 110 and the lower harness 112 to position the support 826 and snap component 124 as desired. While the embodiment of FIG. 8 illustrates the support 826 between two spacers 118, it may be in various other positions as desired.

Figure 9:
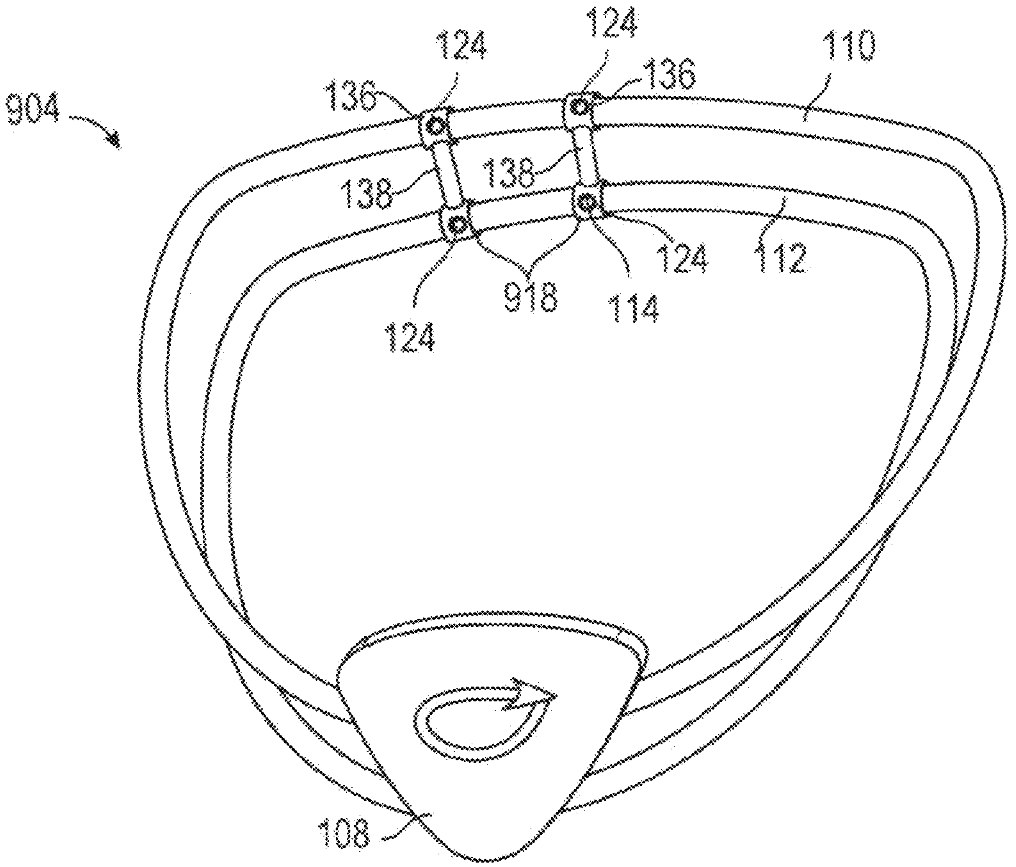
FIG. 9 illustrates a piece of respiratory equipment of a respiratory system with another example of a retention mechanism according to embodiments of the disclosure.

FIG. 9 illustrates an example of a respiratory mask assembly 904 that is substantially similar to the respiratory mask assembly 104 except that the retention mechanism 114 of the respiratory mask assembly 904 includes a plurality of snap components 124 provided directly on each spacer 918. In the example of FIG. 9, the snap components are provided on the harness-receiving portions 136 of the spacers 918.

Figure 10:
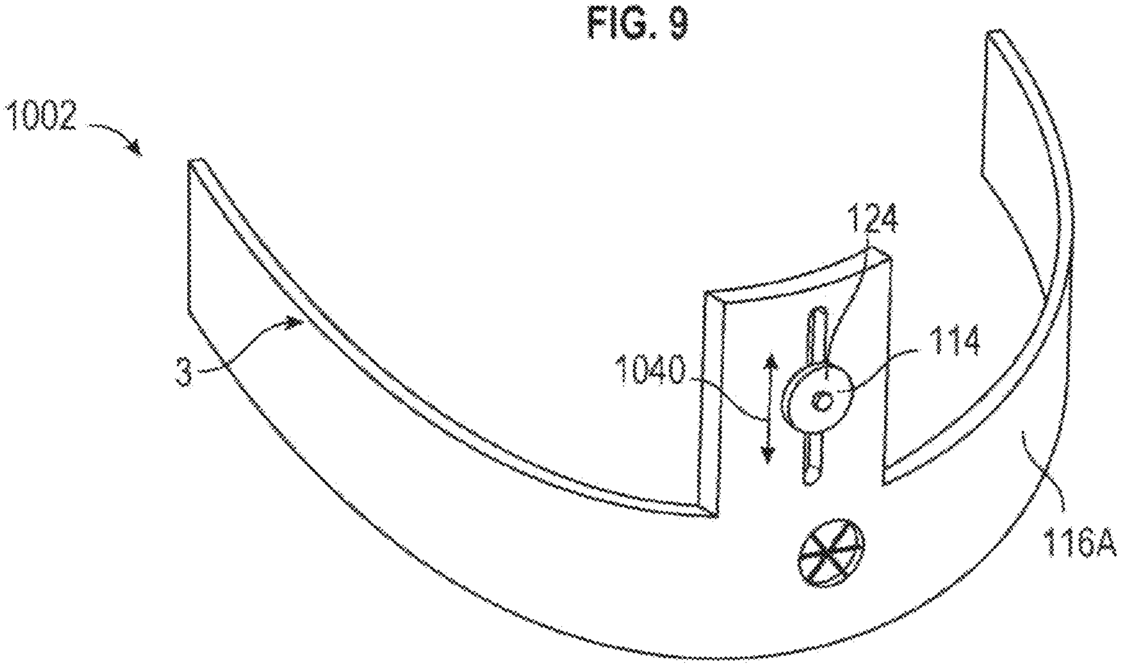
FIG. 10 illustrates a portion of a head armature of a respiratory system with another example of a retention mechanism according to embodiments of the disclosure.

FIG. 10 illustrates an example of a portion of a head armature 1002 that is substantially similar to the head armature 102 except that the head armature 1002 includes the snap component 124 on the transverse portion 116B. In the example of FIG. 10, the snap component 124 is vertically adjustable (represented by arrow 1040) relative to the head armature 1002.

Figure 11:
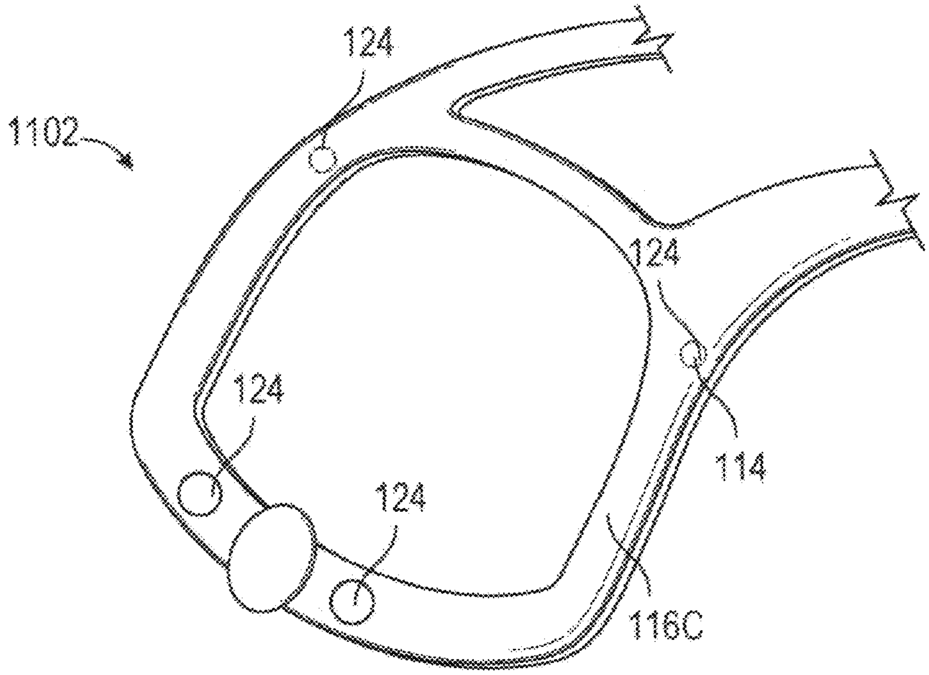
FIG. 11 illustrates a portion of a head armature of a respiratory system with another example of a retention mechanism according to embodiments of the disclosure.

FIG. 11 illustrates a rear portion 116C of a head armature 1102 that is configured to cover a portion of the user's head opposite from the cradle (not shown in FIG. 11). In the example of FIG. 11, the retention mechanism 114 includes a plurality of the snap components 124 provided on the rear portion 116C. In certain embodiments with a plurality of snap components 124, a size of at least one snap component 124 may be different from a size of another snap component 124 such that the head armature and respiratory mask assembly can only be connected in a particular orientation (i.e., because mismatched snap components 124 cannot be connected together).

Figure 12:
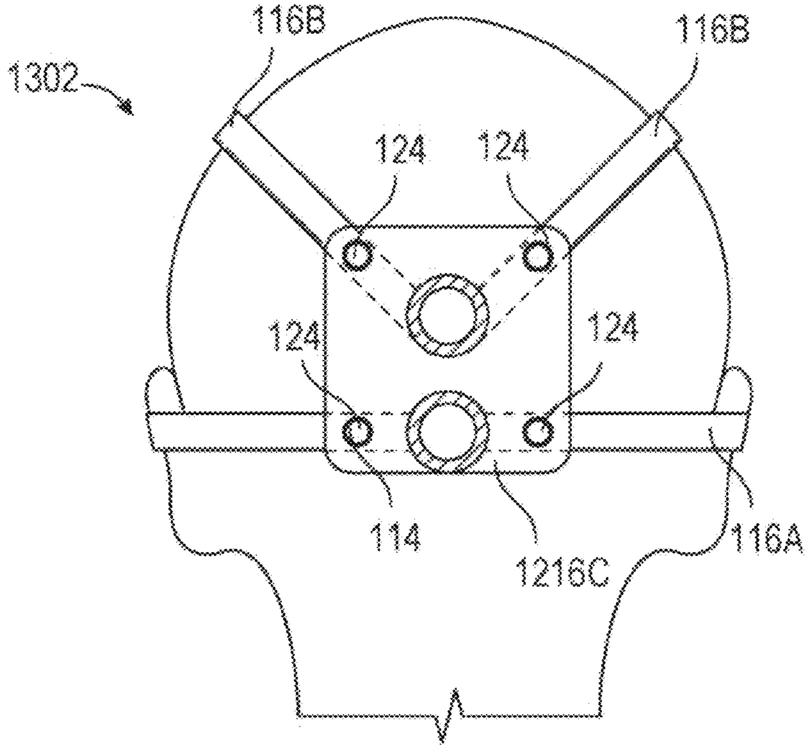
FIG. 12 illustrates a portion of a head armature of a respiratory system with another example of a retention mechanism according to embodiments of the disclosure.

FIG. 12 illustrates a portion of another head armature 1202 according to various embodiments. Compared to the head armature 102, the head armature 1202 includes two transverse portions 116B and another rear portion 1216C. Similar to the head armature 1102, the head armature 1202 includes a plurality of the snap components 124 provided on the rear portion 1216C.

FIGS. 13-17 illustrate examples where the retention mechanism 114 is a buckle system 1341 having a male component and a female component. The male component and/or the female component may be directly attached to the head armature and/or the respiratory mask assembly or may be attached via support structures. In embodiments with support structures, the support structures may include, but are not limited to, fabric straps, elastic straps, silicone frame, and/or a molded frame. Optionally, the buckle system 1341 may have one or more locking points such that the male component locks at various positions relative to the female component to provide various fits to the head as desired by the user. As illustrated in these embodiments, the buckle system 1341 may be on only one of the head armature or the respiratory mask assembly, or they may be on both the head armature and the respiratory mask assembly. In examples where the retention mechanism 114 is the buckle system 1341, the retention mechanism may be a positive retention mechanism that requires a specific additional action to detach the head armature from the respiratory mask assembly. Such specific additional actions may include, but are not limited to, pinching and/or pressing one or both of the male component and the female component of the buckle system 1341. It will be appreciated that while the following description makes reference to particular positions or locations of male components and female components, in other embodiments, the particular positions or locations may be swapped.

Figure 13:
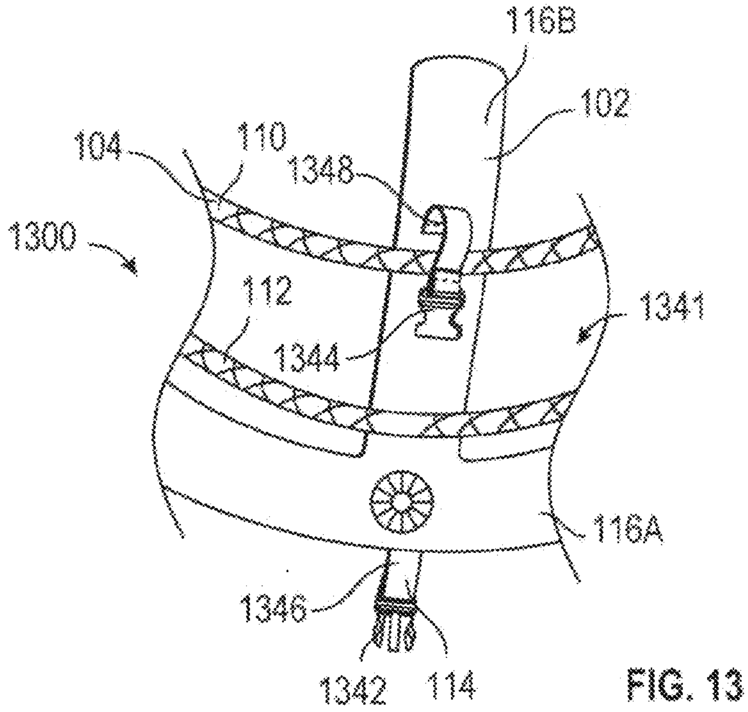
FIG. 13 illustrates a portion of a respiratory mask assembly of a respiratory system with another example of a retention mechanism according to embodiments of the disclosure.

FIG. 13 illustrates an example of a portion of a respiratory system 1300 that includes the head armature 102, the respiratory mask assembly 104, and the buckle system 1341. In the example of FIG. 13, the buckle system 1341 includes a male component 1342 and a female component 1344 both attached to the head armature 102. In this example, the male component 1342 and the female component 1344 are attached to the head armature 102 via straps 1346, 1348, respectively, and the male component 1342 is configured to selectively engage the female component 1344 such that portions of the harnesses 110, 112 are retained between the buckle system 1341 and the head armature 102.

Figure 14:
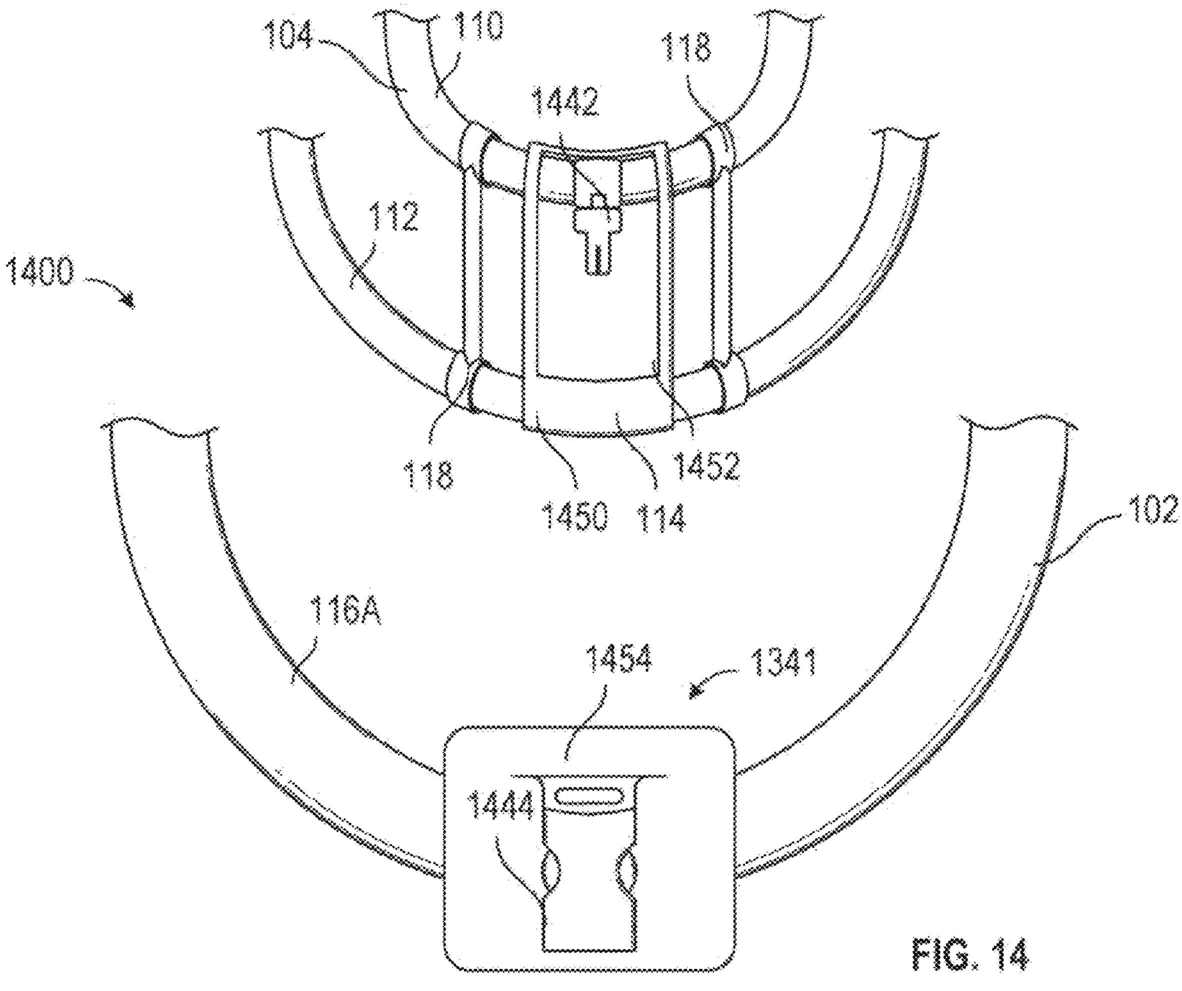
FIG. 14 illustrates a portion of a respiratory system with another example of a retention mechanism according to embodiments of the disclosure.

FIG. 14 illustrates an example of a portion of a respiratory system 1400 that includes the head armature 102 and the respiratory mask assembly 104. In the example of FIG. 14, the buckle system 1341 includes a male component 1442 on the upper harness 110 and a female component 1444 on the circumferential portion 116A of the head armature 102. In this example, the male component 1442 also includes an alignment structure 1450 extending between the upper harness 110 and the lower harness 112 and that defines an alignment aperture 1452. The female component 1444 includes an alignment panel 1454 that is selectively received within the alignment aperture 1452 to facilitate positioning and securing of the head armature 102 relative to the respiratory mask assembly 104.

Figure 15:
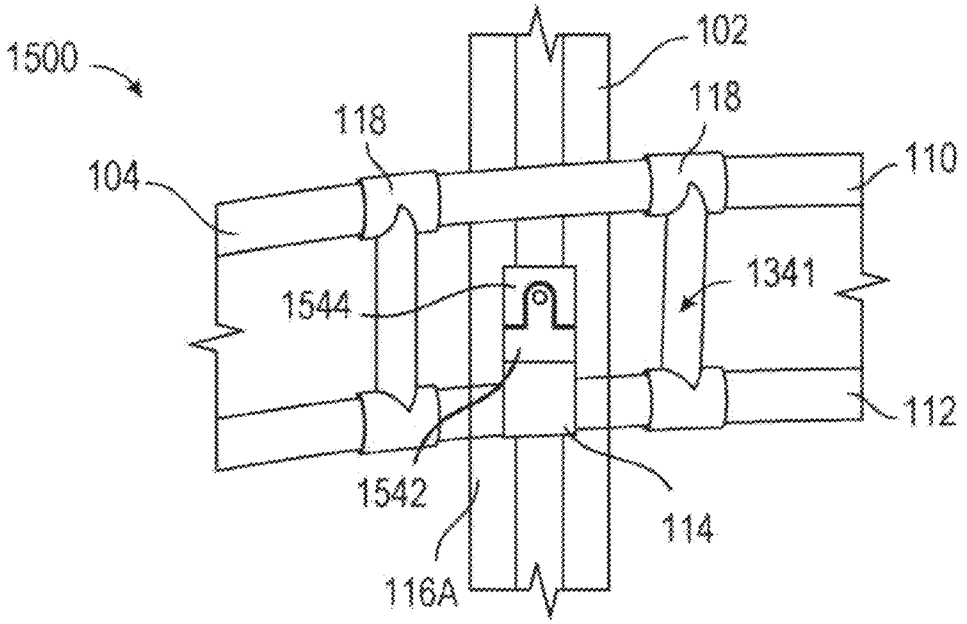
FIG. 15 illustrates a portion of a respiratory mask assembly of a respiratory system with another example of a retention mechanism according to embodiments of the disclosure.

FIG. 15 illustrates an example of a portion of a respiratory system 1500 that includes the head armature 102 and the respiratory mask assembly 104. In the example of FIG. 15, the buckle system 1341 includes a male component 1542 on the lower harness 112 and a female component 1544 on the transverse portion 116B of the head armature 102.

Figure 16:
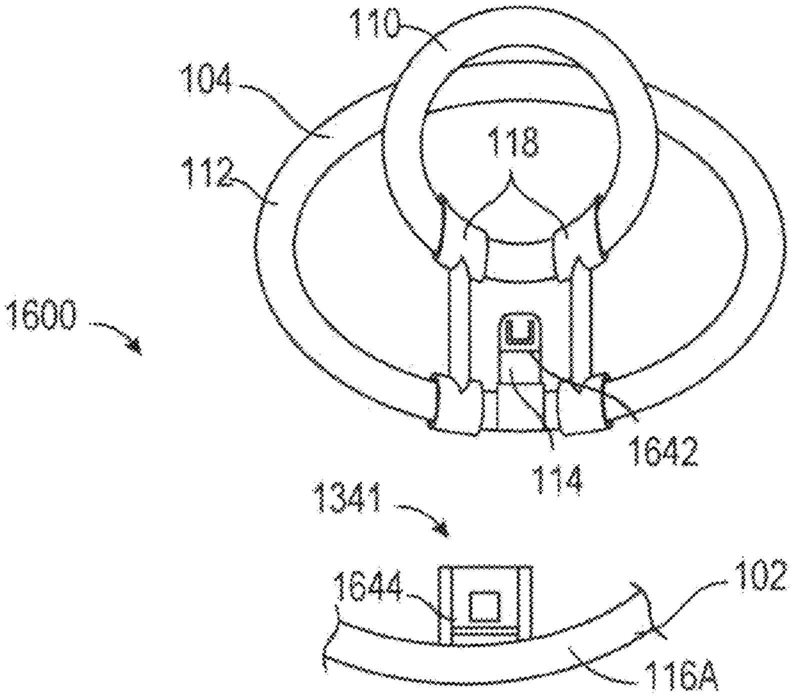
FIG. 16 illustrates a portion of a respiratory system with another example of a retention mechanism according to embodiments of the disclosure.

FIG. 16 illustrates an example of a portion of a respiratory system 1600 that includes the head armature 102 and the respiratory mask assembly 104. The mask of the respiratory mask assembly 104 has been omitted from FIG. 16 for clarity of the figure. In the example of FIG. 16, the buckle system 1341 includes a male component 1642 on the lower harness 112 and a female component 1644 on the circumferential portion 116A of the head armature 102.

Figure 17:
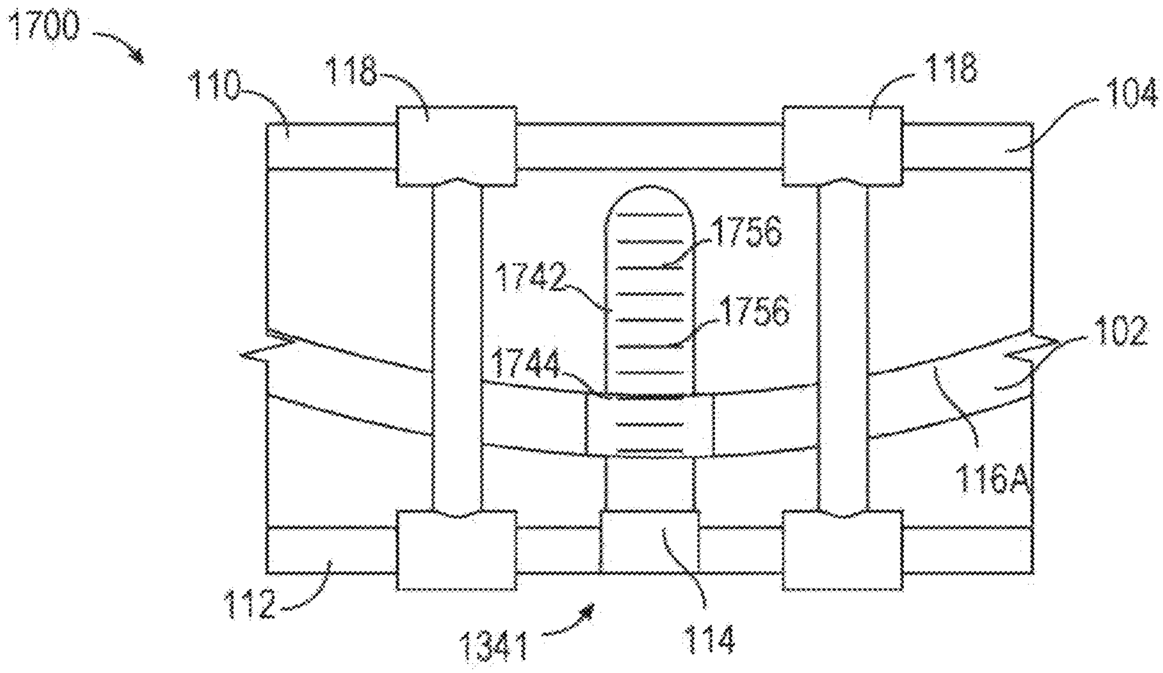
FIG. 17 illustrates a portion of a respiratory system with another example of a retention mechanism according to embodiments of the disclosure.

FIG. 17 illustrates an example of a portion of a respiratory system 1700 that includes the head armature 102 and the respiratory mask assembly 104. In the example of FIG. 17, the buckle system 1341 includes a male component 1742 on the lower harness 112 and a female component 1744 on the circumferential portion 116A of the head armature 102. As illustrated in FIG. 17, the male component 1742 includes a plurality of locking points 1756 such that the male component 1742 may lock at various positions relative to the female component 1744 to provide various fits to the head as desired by the user. While the male component 1742 is illustrated as only on one of the harnesses (i.e., the lower harness 112) in FIG. 17, in other embodiments, the male component 1742 may be on only the upper harness 110 or may extend between the upper harness 110 and the lower harness 112.

Figure 18:
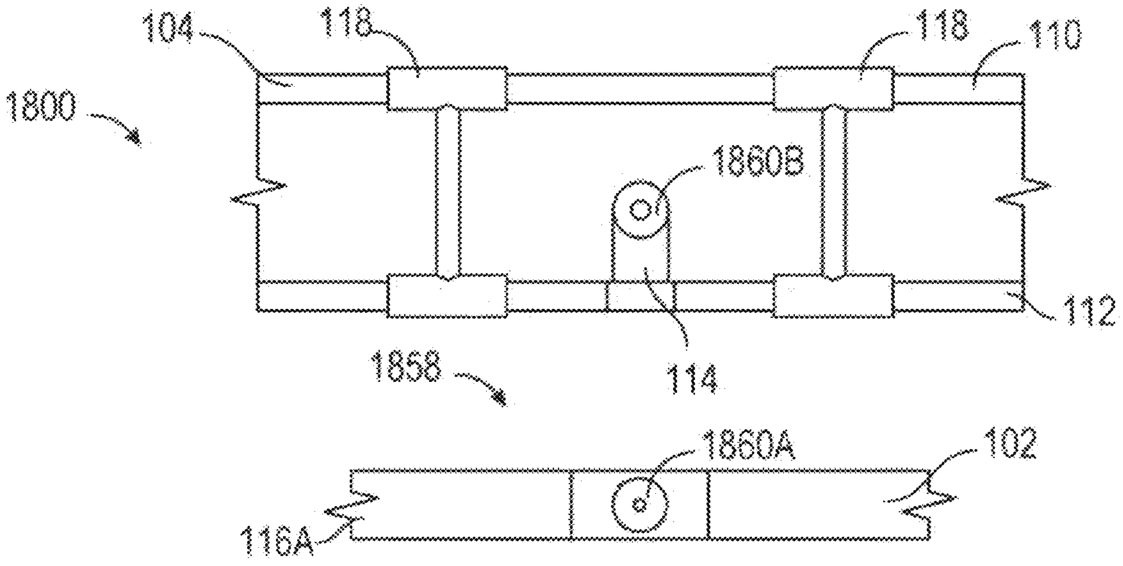
FIG. 18 illustrates a portion of a respiratory system with another example of a retention mechanism according to embodiments of the disclosure.

FIG. 18 illustrates an example of a portion of a respiratory system 1800 that includes the head armature 102 and the respiratory mask assembly 104. In the respiratory system 1800, the retention mechanism 114 includes a magnetic system 1858 having a first magnet 1860A on the head armature 102 and a second magnet 1860B on the respiratory mask assembly 104, although the number of magnets of the magnetic system 1858 should not be considered limiting on the disclosure. In the example illustrated, the first magnet 1860A is provided on the circumferential portion 116A and the second magnet 1860B is connected to the lower harness 112. In other examples, the first magnet 1860A and/or the second magnet 1860B may be provided at various other locations or otherwise connected to the head armature 102 and the respiratory mask assembly 104 as desired. In examples where the retention mechanism 114 is the magnetic system 1858, the retention mechanism 114 may be a passive retention mechanism.

FIGS. 19-23 illustrate examples where the retention mechanism 114 includes a clip system 1961 having at least one clip that directly or indirectly engages the head armature or the respiratory mask assembly. As one non-limiting example, the clip system 1961 may directly engage the upper harness 110, the lower harness 112, and/or the circumferential portion 116A. In examples where the retention mechanism 114 is the clip system 1961, the retention mechanism 114 may be a passive retention mechanism or a positive retention mechanism. The clip system 1961 and components of the clip system 1961 may be provided at various locations on the head armature and/or the respiratory mask assembly as desired.

Figure 19:
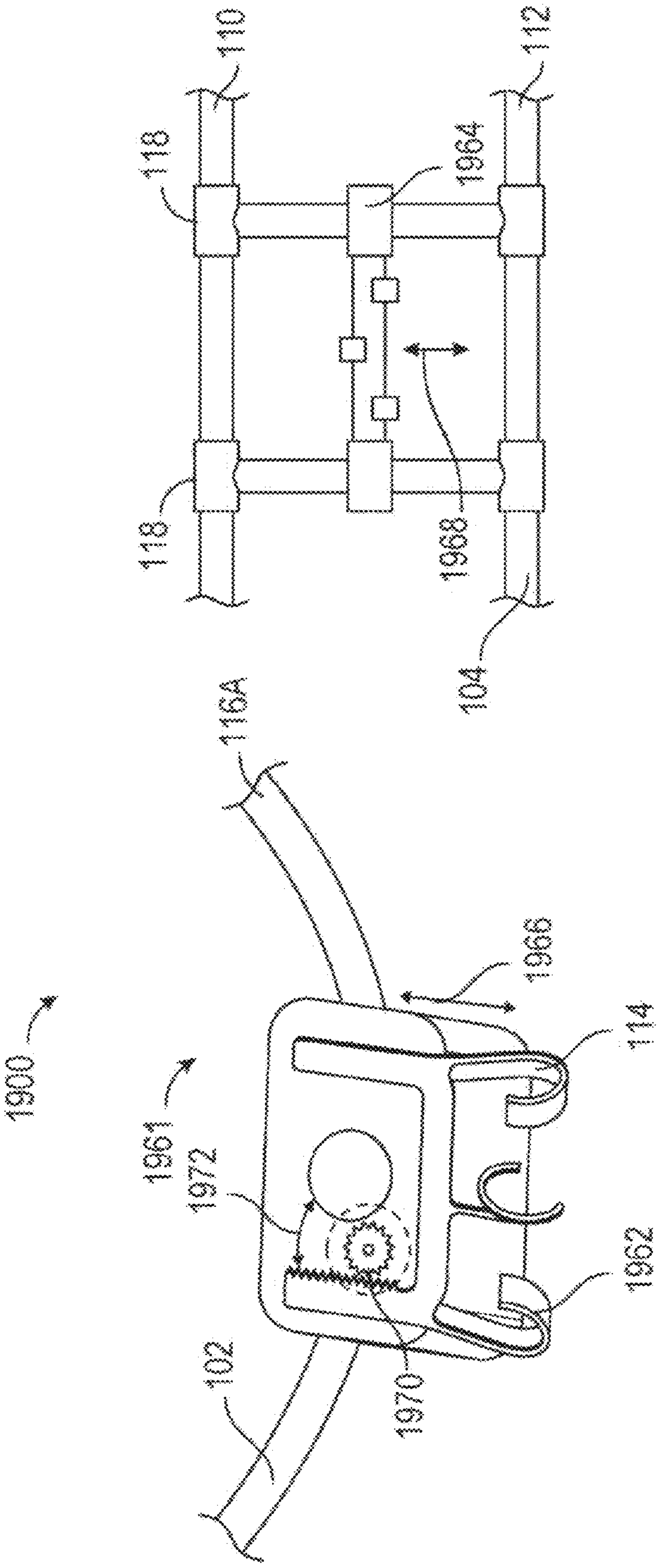
FIG. 19 illustrates a portion of a respiratory system with another example of a retention mechanism according to embodiments of the disclosure.

FIG. 19 illustrates an example of a portion of a respiratory system 1900 that includes the head armature 102 and the respiratory mask assembly 104. In the example of FIG. 17, the clip system 1961 includes a clip 1962 on the head armature 102 that selectively engages a support 1964 on the respiratory mask assembly 104. In the example illustrated, the clip 1962 is on the circumferential portion 116A and the support 1964 extends between two spacers 118, although in other examples, the clip 1962 and/or the support 1964 may be provided at various other locations as desired. In certain aspects, the clip 1962 is vertically adjustable (represented by arrow 1966) and the support 1964 is vertically adjustable (represented by arrow 1968). The clip 1962 and support 1964 may be adjustable via various suitable mechanisms as desired. In the example illustrated, the clip 1962 is vertically adjustable via rotation of a gear 1970 (rotation represented by arrow 1972), and the support 1964 is slidable along the spacers 118.

Figure 20:
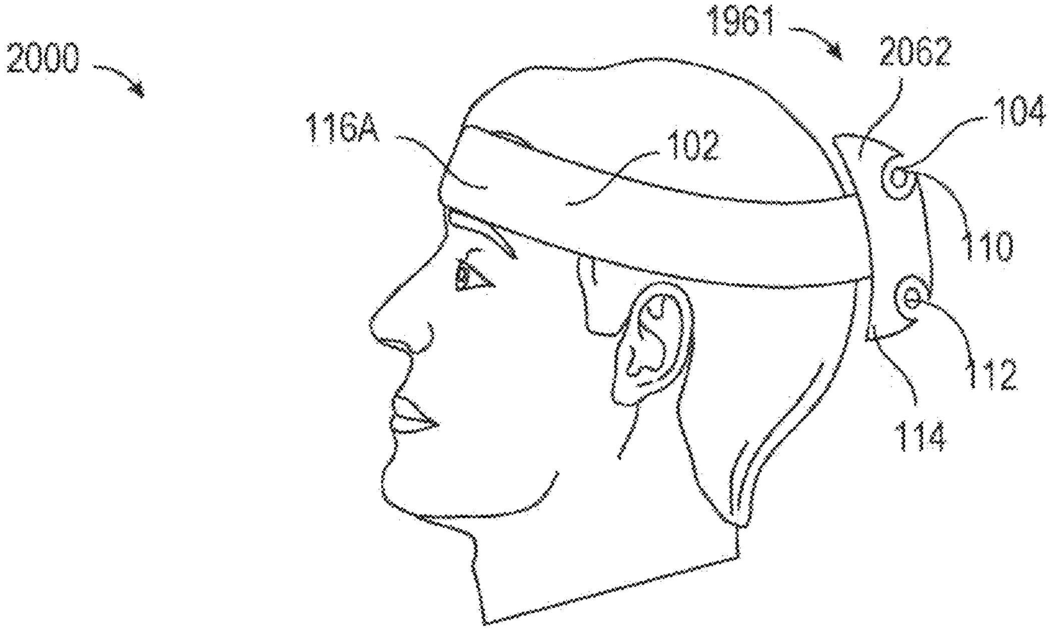
FIG. 20 illustrates a portion of a respiratory system with another example of a retention mechanism according to embodiments of the disclosure.

FIG. 20 illustrates an example of a portion of a respiratory system 2000 that includes the head armature 102 and the respiratory mask assembly 104. In FIG. 20, the upper harness 110 and the lower harness 112 are only illustrated in a sectional view and the mask has been omitted for clarity of the figures. In this example, the clip system 1961 includes a clip 2062 on the head armature 102 that directly engages the upper harness 110 and the lower harness 112.

Figure 21:
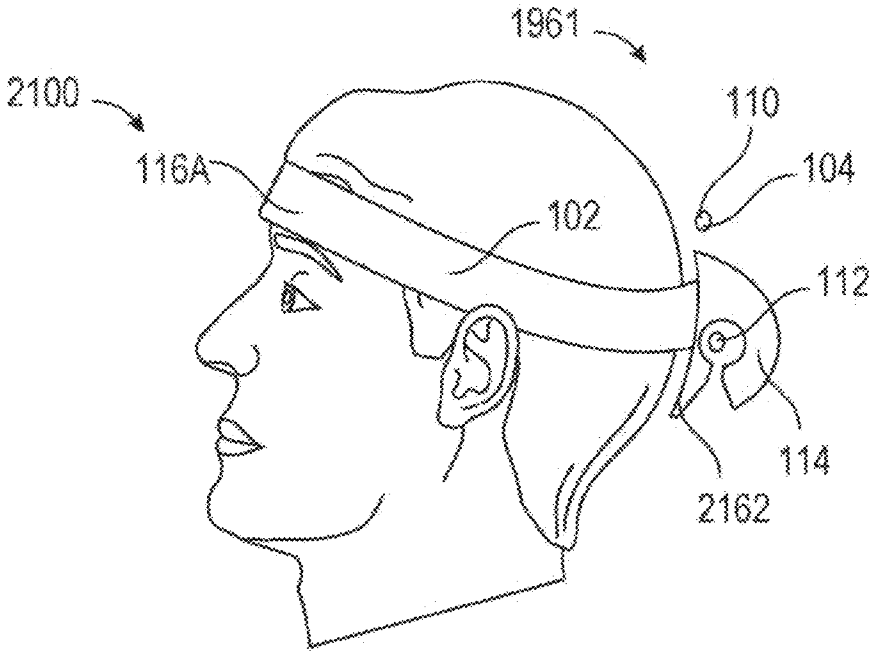
FIG. 21 illustrates a portion of a respiratory system with another example of a retention mechanism according to embodiments of the disclosure.

FIG. 21 illustrates an example of a portion of a respiratory system 2100 that includes the head armature 102 and the respiratory mask assembly 104. In FIG. 21, the upper harness 110 and the lower harness 112 are only illustrated in a sectional view and the mask has been omitted for clarity of the figures. In this example, the clip system 1961 includes a clip 2162 on the head armature 102 that directly engages only one of the harnesses (e.g., the lower harness 112).

Figure 22:
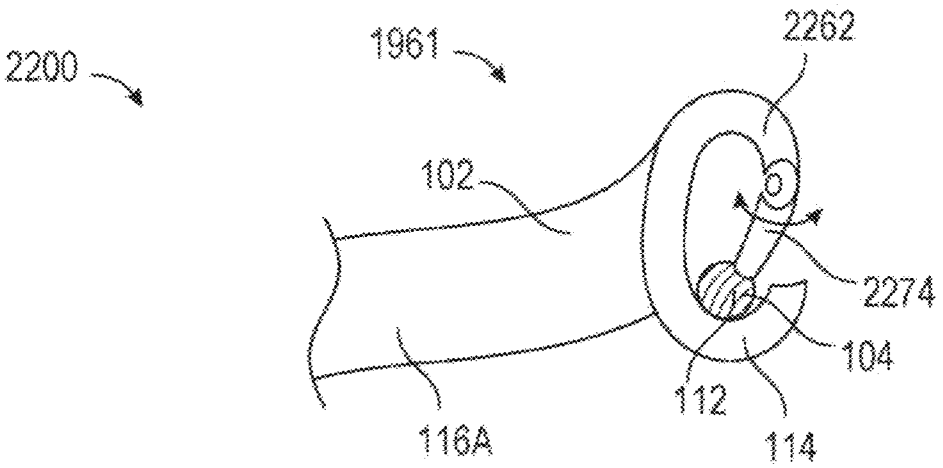
FIG. 22 illustrates a portion of a head armature of a respiratory system with another example of a retention mechanism according to embodiments of the disclosure.

FIG. 22 illustrates an example of a portion of a respiratory system 2200 that includes the head armature 102 and the respiratory mask assembly 104. In this example, the clip system 1961 is similar to that of FIG. 21 and includes a clip 2262 on the head armature 102 that directly engages only one of the harnesses (e.g., the lower harness 112). In the example of FIG. 22, the clip 2262 also includes a pivotable lock 2274 that selectively provides further retention of the clip 2262 on the lower harness 112.

Figure 23:
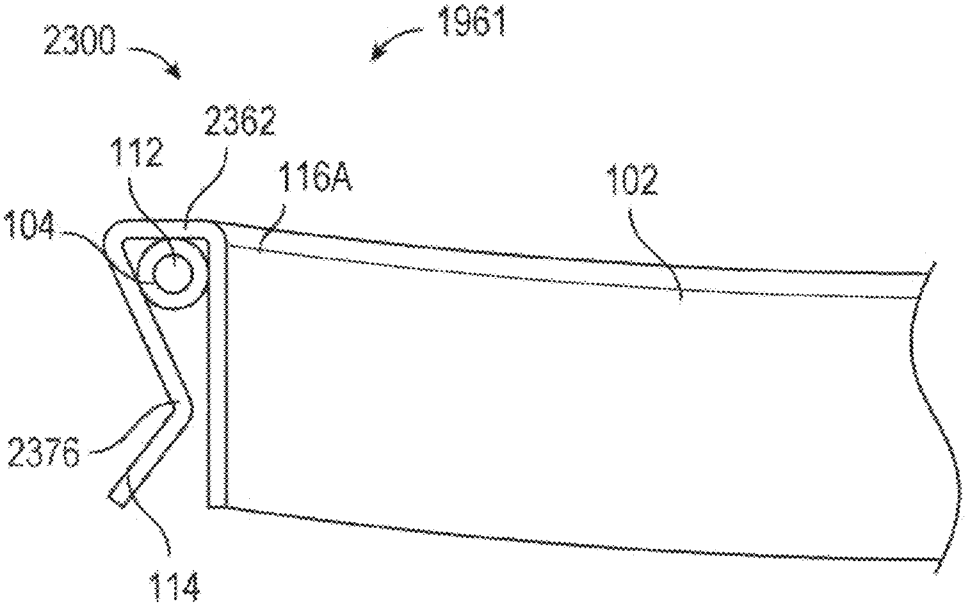
FIG. 23 illustrates a portion of a head armature of a respiratory system with another example of a retention mechanism according to embodiments of the disclosure.

FIG. 23 illustrates an example of a portion of a respiratory system 2300 that includes the head armature 102 and the respiratory mask assembly 104. In this example, the clip system 1961 is similar to that of FIG. 21 and includes a clip 2362 on the head armature 102 that directly engages only one of the harnesses (e.g., the lower harness 112). In the example of FIG. 22, the clip 2262 also includes a portion 2376 having a reduced dimension that selectively provides further retention of the clip 2362 on the lower harness 112.

Figure 24:
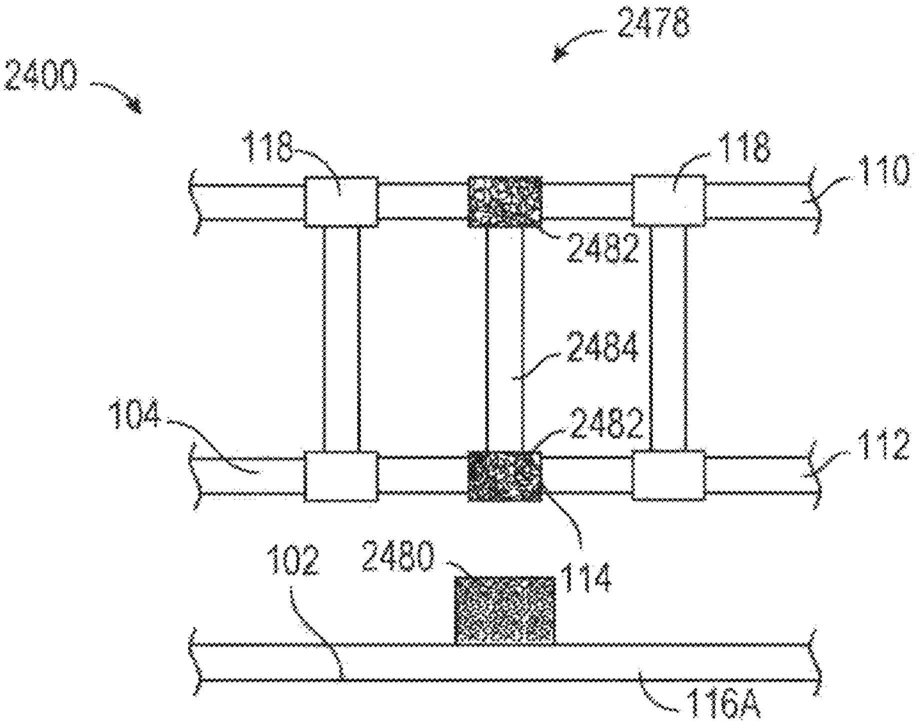
FIG. 24 illustrates a portion of a respiratory system with another example of a retention mechanism according to embodiments of the disclosure.

FIG. 24 illustrates an example of a portion of a respiratory system 2400 that includes the head armature 102 and the respiratory mask assembly 104. In the respiratory system 2400, the retention mechanism 114 includes a hook and loop fastener system 2478 having hooks (or loops) 2480 on the head armature 102 and complimentary loops (or hooks) 2482 on the respiratory mask assembly 104. In the example illustrated, the hooks 2480 are provided on the circumferential portion 116A of the head armature 102, and the loops 2482 are provided on both the upper harness 110 and the lower harness 112. In other examples, the hooks 2480 and/or the loops 2482 may be provided at various other locations or otherwise connected to the head armature 102 and the respiratory mask assembly 104 as desired. In the example illustrated, a connector 2484 connects the loops 2482 on the upper harness 110 and the lower harness 112 such that a relative positioning of the loops 2482 on the harnesses 110, 112 may be maintained. In other examples, the connector 2484 may be omitted. In examples where the retention mechanism 114 is the hook and loop fastener system 2478, the retention mechanism 114 may be a passive retention mechanism.

Referring back to FIGS. 4A-C, a method of using the respiratory system 100 may include using the respiratory system 100 in an emergency mode (FIG. 4A) or in a stand-by or preventive mode (FIGS. 4B-C).

In various examples, and referring to FIG. 4A, using the respiratory system 100 in the emergency mode includes removing the respiratory mask assembly 104 from a stowage location (if stowed) and donning the respiratory mask assembly 104 on the head of the user 422 in the first use position. In various aspects, donning the respiratory mask assembly 104 in the first use position includes donning the respiratory mask assembly 104 without assembling the respiratory mask assembly 104 with the head armature 102. In various aspects, donning the respiratory mask assembly 104 may be done with a single hand of the user and performed in five seconds or less. Donning the respiratory mask assembly 104 includes positioning the mask 108 of the respiratory mask assembly 104 over the mouth and nose of the user 422. In examples where the harnesses 110, 112 are inflatable, the harnesses may be inflated before or after the respiratory mask assembly 104 is positioned on the head of the user 422. The mask 108 positioned over the mouth and nose of the user 422 provides oxygen to the user 422 to prevent or minimize the risk of hypoxia.

In various examples, and referring to FIGS. 4B-C, using the respiratory system 100 in the preventive mode includes removing each of the respiratory mask assembly 104 and the head armature 102 from stowage. The method includes detachably connecting the head armature 102 with the respiratory mask assembly 104 via the retention mechanism 114. In certain cases, the head armature 102 may be detachably connected to the respiratory mask assembly 104 before the head armature 102 is positioned on the head of the user 422 or after the head armature 102 is positioned on the head of the user 422. The method includes positioning the head armature 102 and the respiratory assembly 104 on the head of the user 422 and such that the mask 108 is in the stand-by position in which the mask 108 is positioned on the cradle 106 of the head armature 102. When the user 422 needs a supply of oxygen, and referring to FIG. 4C, the method includes moving the mask 108 from the stand-by position to the second use position. In some cases, moving the mask 108 from the stand-by position to the second use position includes detaching the respiratory mask assembly 104 from the head armature 102 by disengaging the retention mechanism 114. In certain aspects, disengaging the retention mechanism 114 includes passively disengaging the retention mechanism 114 or positively disengaging the retention mechanism 114. In various aspects, moving the respiratory mask assembly 104 to the second use position may be done with a single hand of the user and performed in five seconds or less. Moving the respiratory mask assembly 104 to the second use position includes positioning the mask 108 of the respiratory mask assembly 104 over the mouth and nose of the user 422. In examples where the harnesses 110, 112 are inflatable, the harnesses may be inflated before or after the respiratory mask assembly 104 is positioned on the head of the user 422 in the second use position. The mask 108 positioned over the mouth and nose of the user 422 provides oxygen to the user 422 to prevent or minimize the risk of hypoxia.

Illustrations

A collection of exemplary embodiments are provided below, including at least some explicitly enumerated as "Illustrations" providing additional description of a variety of example embodiments in accordance with the concepts described herein. These Illustrations are not meant to be mutually exclusive, exhaustive, or restrictive; and the disclosure not limited to these examples but rather encompasses all possible modifications and variations within the scope of the issued claims and their equivalents.

Illustration 1. A head armature for a respiratory system, the head armature comprising: a cradle configured to receive a respiratory mask assembly in a stand-by position; and a retention mechanism configured to detachably connect the respiratory mask assembly with the head armature such that the respiratory mask assembly is movable from the stand-by position to a use position while connected to the head armature and such that the respiratory mask assembly is selectively detachable from the head armature in a stand-alone configuration whereby the respiratory mask assembly is disconnected from the head armature, wherein, in the use position, the respiratory mask assembly is configured to provide oxygen to a user, and wherein the head armature is configured to be worn on a head of the user such that the cradle is between the respiratory mask assembly and the user's head when the respiratory mask assembly is in the stand-by position.

Illustration 2. The head armature of any of the preceding or subsequent illustrations or combination of illustrations, wherein the cradle is configured to receive a respiratory mask of the respiratory mask assembly in the stand-by position.

Illustration 3. The head armature of any of the preceding or subsequent illustrations or combination of illustrations, wherein the retention mechanism is configured to detachably connect the head armature to a harness of the respiratory mask assembly.

Illustration 4. The head armature of any of the preceding or subsequent illustrations or combination of illustrations, wherein the retention mechanism is configured to detachably connect the head armature to at least one of an upper harness of the harness, a lower harness of the harness, or at least one spacer of the harness.

Illustration 5. The head armature of any of the preceding or subsequent illustrations or combination of illustrations, wherein the retention mechanism comprises at least one of a snap fastener, a buckle, a clip, a magnet, or hook and loop fasteners.

Illustration 6. The head armature of any of the preceding or subsequent illustrations or combination of illustrations, wherein the retention mechanism is configured to detachably connect the head armature to a respiratory mask of the respiratory mask assembly.

Illustration 7. A quick donning respiratory system comprising: a head armature comprising a cradle and a retention mechanism; and a respiratory mask assembly, wherein the respiratory mask assembly is received on the cradle in a stand-by position, wherein the retention mechanism detachably connects the respiratory mask assembly with the head armature such that the respiratory mask assembly is movable from the stand-by position to a use position while connected to the head armature and such that the respiratory mask assembly is selectively detachable from the head armature to provide a stand-alone configuration whereby the respiratory mask assembly is disconnected from the head armature, wherein, in the use position, the respiratory mask assembly provides oxygen to a user, and wherein the head armature is configured to be worn on a head of the user such that the cradle is between the respiratory mask assembly and the user's head when the respiratory mask assembly is in the stand-by position.

Illustration 8. The quick donning respiratory system of any of the preceding or subsequent illustrations or combination of illustrations, wherein the respiratory mask assembly comprises a respiratory mask and a harness, and wherein the respiratory mask is received on the cradle in the stand-by position.

Illustration 9. The quick donning respiratory system of any of the preceding or subsequent illustrations or combination of illustrations, wherein the retention member detachably connects the head armature with the harness of the respiratory mask assembly.

Illustration 10. The quick donning respiratory system of any of the preceding or subsequent illustrations or combination of illustrations, wherein the harness comprises an upper harness, a lower harness, and at least one spacer extending between the upper harness and the lower harness, and wherein the retention member detachably connects the head armature with at least one of the upper harness, the lower harness, or the at least one spacer.

Illustration 11. The quick donning respiratory system of any of the preceding or subsequent illustrations or combination of illustrations, wherein the retention member detachably connects the head armature with the respiratory mask.

Illustration 12. The quick donning respiratory system of any of the preceding or subsequent illustrations or combination of illustrations, wherein the harness is inflatable.

Illustration 13. The quick donning respiratory system of any of the preceding or subsequent illustrations or combination of illustrations, wherein the retention mechanism comprises at least one of a snap fastener, a buckle, a clip, a magnet, or hook and loop fasteners.

Illustration 14. A quick donning respiratory system comprising: a head armature comprising a cradle and a retention mechanism; and a respiratory mask assembly comprising a respiratory mask and a harness, wherein the respiratory mask of the respiratory mask assembly is received on the cradle in a stand-by position, wherein the retention mechanism detachably connects the respiratory mask assembly with the head armature at least while the respiratory mask assembly is in the stand-by position, wherein, in the stand-by position, the respiratory mask assembly does not provide oxygen to a user, and wherein the head armature is configured to be worn on a head of the user such that the cradle is between the respiratory mask of the respiratory mask assembly and the user's head when the respiratory mask assembly is in the stand-by position.

Illustration 15. The quick donning respiratory system of any of the preceding or subsequent illustrations or combination of illustrations, wherein the retention member detachably connects the head armature with the harness of the respiratory mask assembly.

Illustration 16. The quick donning respiratory system of any of the preceding or subsequent illustrations or combination of illustrations, wherein the harness comprises an upper harness, a lower harness, and at least one spacer extending between the upper harness and the lower harness, and wherein the retention member detachably connects the head armature with at least one of the upper harness, the lower harness, or the at least one spacer.

Illustration 17. The quick donning respiratory system of any of the preceding or subsequent illustrations or combination of illustrations, wherein the retention member detachably connects the head armature with the respiratory mask.

Illustration 18. The quick donning respiratory system of any of the preceding or subsequent illustrations or combination of illustrations, wherein the harness of the respiratory mask assembly is detached from the head armature.

Illustration 19. The quick donning respiratory system of any of the preceding or subsequent illustrations or combination of illustrations, wherein the retention mechanism detachably connects the respiratory mask assembly with the head armature such that the respiratory mask assembly is movable from the stand-by position to a use position while connected to the head armature and such that the respiratory mask assembly is movable to a stand-alone configuration disconnected from the head armature.

Illustration 20. The quick donning respiratory system of any of the preceding or subsequent illustrations or combination of illustrations, wherein the retention mechanism comprises at least one of a snap fastener, a buckle, a clip, a magnet, or hook and loop fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A respiratory system, the respiratory system comprising:

a head armature comprising:

a cradle including a first retention mechanism integrated on the head armature at a first location on the head armature; and a respiratory mask assembly comprising:

an upper harness;

a lower harness;

at least one spacer coupled between the upper harness and the lower harness and configured to space the upper harness from the lower harness, wherein the cradle is configured to receive the respiratory mask assembly in a stand-by position; and a second retention mechanism integrated on the respiratory mask assembly configured to mate with the head armature and coupled to at least one of the upper harness or the lower harness and located proximate to the at least one spacer, wherein actuation of the second retention mechanism is configured to detachably connect the respiratory mask assembly with the head armature at a second location proximate to the second retention mechanism such that the respiratory mask assembly is movable from the stand-by position to a use position while connected to the head armature and such that the respiratory mask assembly is selectively detachable from the head armature in a stand-alone configuration whereby the respiratory mask assembly is disconnected from the head armature, wherein, in the use position, the respiratory mask assembly is configured to provide oxygen to a user and actuation of the second retention mechanism does not cause either of the upper harness or the lower harness to disconnect from the respiratory mask assembly, and wherein the head armature is configured to be worn on a head of the user such that the cradle is between the respiratory mask assembly and the user's head when the respiratory mask assembly is in the stand-by position.

2. The respiratory system of claim 1, wherein the cradle is configured to receive a respiratory mask of the respiratory mask assembly in the stand-by position.

3. The respiratory system of claim 1, wherein the second retention mechanism is configured to detachably connect the head armature to a harness of the respiratory mask assembly.

4. The respiratory system of claim 1, wherein the second retention mechanism is configured to detachably connect the head armature to at least one of the upper harness, the lower harness, or the at least one spacer.

5. The respiratory system of claim 1, wherein the second retention mechanism comprises at least one of a snap fastener, a buckle, a clip, a magnet, or hook and loop fasteners.

6. The respiratory system of claim 1, wherein the second retention mechanism is configured to detachably connect the head armature to a respiratory mask of the respiratory mask assembly.

7. The respiratory system of claim 1, wherein the second retention mechanism includes a snap component on a support.

8. The respiratory system of claim 7, wherein the support is configured to be adjustable in a direction relative to the upper harness or the lower harness.

9. The respiratory system of claim 7, wherein the snap component is on a harness-receiving portion of the at least one spacer.

10. The respiratory system of claim 1, wherein the second retention mechanism is located on a support that couples to two spacers.

11. The respiratory system of claim 10, wherein the support is movable relative to the two spacers.

12. The respiratory system of claim 1, wherein the second retention mechanism is a slidable retention mechanism.

13. The respiratory system of claim 1, wherein the second retention mechanism includes at least one couplable strap, wherein the at least one couplable strap is configured to engage the upper harness or the lower harness by at least partially surrounding i) the upper harness, ii) the lower harness, or both i) and ii).

14. The respiratory system of claim 1, wherein the second retention mechanism includes a plurality of locking points that are configured to adjust a tension in the head armature.

15. A respiratory system, the respiratory system comprising:

a head armature comprising:

a cradle including a first retention mechanism integrated on the head armature at a first location on the head armature; and a respiratory mask assembly comprising:

an upper harness;

a lower harness;

at least one spacer coupled between the upper harness and the lower harness and configured to space the upper harness from the lower harness, wherein the cradle is configured to receive the respiratory mask assembly in a stand-by position; and a second retention mechanism integrated on the respiratory mask assembly and configured to mate with the head armature and coupled to at least one of the upper harness or the lower harness and configured to detachably connect the respiratory mask assembly with the head armature at a second location proximate to the second retention mechanism such that the respiratory mask assembly is movable from the stand-by position to a use position while connected to the head armature and such that the respiratory mask assembly is selectively detachable from the head armature in a stand-alone configuration whereby the respiratory mask assembly is disconnected from the head armature, wherein, in the use position, the respiratory mask assembly is configured to provide oxygen to a user and actuation of the second retention mechanism does not cause either of the upper harness or the lower harness to disconnect from the respiratory mask assembly, and wherein the head armature is configured to be worn on a head of the user such that the cradle is between the respiratory mask assembly and the user's head when the respiratory mask assembly is in the stand-by position.

16. The respiratory system of claim 15, wherein the second retention mechanism includes at least two retention mechanisms.

17. The respiratory system of claim 16, wherein the at least one spacer includes two spacers, each spacer of the two spacers includes one of the at least two retention mechanisms.

18. A respiratory system, the respiratory system comprising:

a head armature comprising:

a cradle including a first retention mechanism integrated on the head armature at a first location on the head armature; and a respiratory mask assembly comprising:

an upper harness;

a lower harness;

at least one spacer coupled between the upper harness and the lower harness and configured to space the upper harness from the lower harness, wherein the cradle is configured to receive the respiratory mask assembly in a stand-by position; and a second retention mechanism integrated on the respiratory mask assembly and configured to mate with the head armature and coupled to at least one of the upper harness or the lower harness and located on the at least one spacer, wherein actuation of the second retention mechanism is configured to detachably connect the respiratory mask assembly with the head armature at a second location proximate to the second retention mechanism such that the respiratory mask assembly is movable from the stand-by position to a use position while connected to the head armature and such that the respiratory mask assembly is selectively detachable from the head armature in a stand-alone configuration whereby the respiratory mask assembly is disconnected from the head armature, wherein, in the use position, the respiratory mask assembly is configured to provide oxygen to a user and actuation of the second retention mechanism does not cause either of the upper harness or the lower harness to disconnect from the respiratory mask assembly, and wherein the head armature is configured to be worn on a head of the user such that the cradle is between the respiratory mask assembly and the user's head when the respiratory mask assembly is in the stand-by position.

19. The respiratory system of claim 18, wherein the at least one spacer includes a first spacer and a second spacer which separate the upper harness from the lower harness.

20. The respiratory system of claim 19, wherein the second retention mechanism is located on a support that extends between the upper harness and the lower harness and located between the first spacer and the second spacer along the upper harness or the lower harness.

* * * * *